US012246496B2

(12) United States Patent
Serencsits et al.

(10) Patent No.: US 12,246,496 B2
(45) Date of Patent: Mar. 11, 2025

(54) COMPOSITE FUSELAGE FABRICATION

(71) Applicant: The Boeing Company, Chicago, IL (US)

(72) Inventors: William L. Serencsits, Hollywood, SC (US); Richard Alexander Prause, Charleston, SC (US); Luis F. Velasquez, Charleston, SC (US); Daniel Johnson, Charleston, SC (US); Adam D. Lee, Moncks Corner, SC (US)

(73) Assignee: The Boeing Company, Chicago, IL (US)

( * ) Notice: Subject to any disclaimer, the term of this patent is extended or adjusted under 35 U.S.C. 154(b) by 24 days.

(21) Appl. No.: 17/647,432

(22) Filed: Jan. 7, 2022

(65) Prior Publication Data
US 2023/0219307 A1 Jul. 13, 2023

(51) Int. Cl.
B29C 70/54 (2006.01)
B29C 33/30 (2006.01)
B29C 70/30 (2006.01)
B29C 70/38 (2006.01)
B29K 105/08 (2006.01)
B29L 31/30 (2006.01)

(52) U.S. Cl.
CPC .......... *B29C 70/541* (2013.01); *B29C 33/307* (2013.01); *B29C 70/30* (2013.01); *B29C 70/38* (2013.01); *B29C 70/54* (2013.01); *B29K 2105/0872* (2013.01); *B29L 2031/3082* (2013.01)

(58) Field of Classification Search
CPC .............................. B29C 70/38; B29C 33/307
See application file for complete search history.

(56) References Cited

U.S. PATENT DOCUMENTS

| 9,211,679 | B1* | 12/2015 | Metschan | B29C 70/34 |
| 9,873,501 | B2* | 1/2018 | Landry | B29C 31/085 |
| 2009/0148647 | A1* | 6/2009 | Jones | B29C 70/38 |
| | | | | 156/159 |
| 2018/0339469 | A1* | 11/2018 | Stone | B29C 70/388 |
| 2019/0030839 | A1* | 1/2019 | Kismarton | B29C 70/54 |
| 2021/0370621 | A1* | 12/2021 | Wadsworth | B29C 35/02 |

* cited by examiner

Primary Examiner — Scott W Dodds
(74) Attorney, Agent, or Firm — Yee & Associates, P.C.

(57) ABSTRACT

A method apparatus, and system method for manufacturing a composite part. A set of composite preforms is placed on a set of slip sheets. The set of slip sheets with the set of composite preforms is attached to a cure mandrel to form a composite preform assembly.

21 Claims, 20 Drawing Sheets

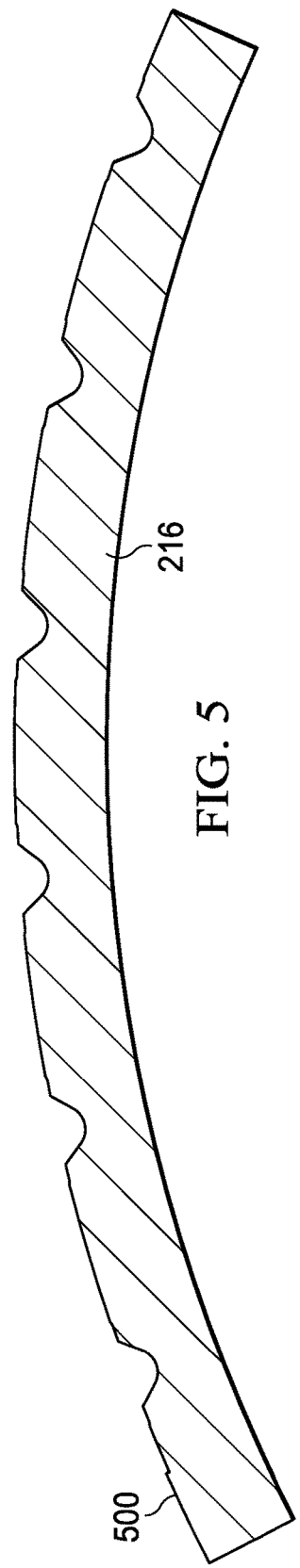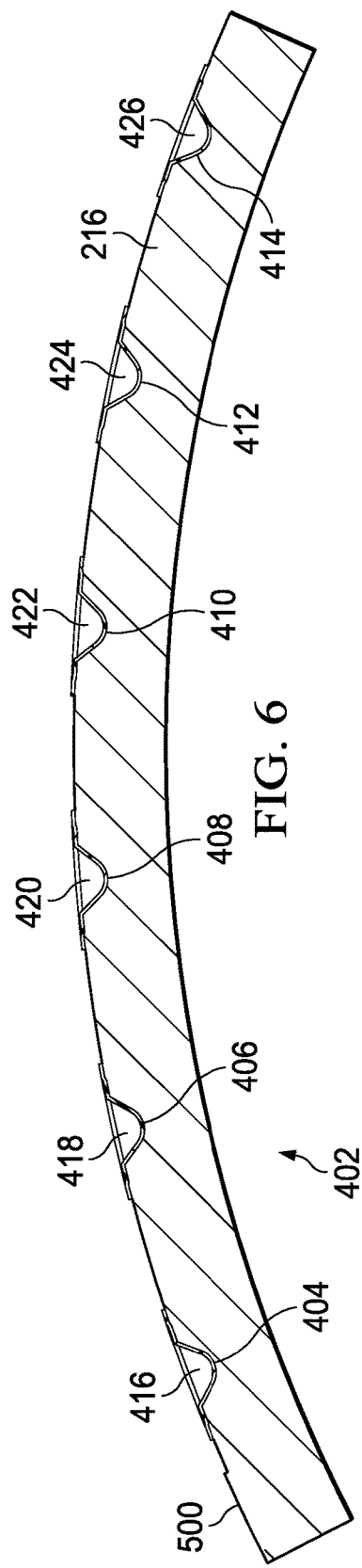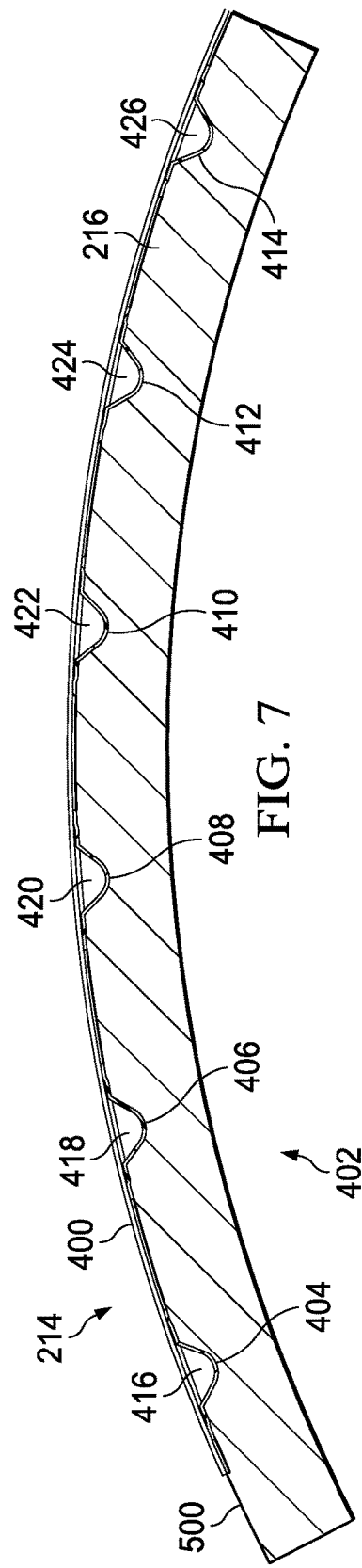

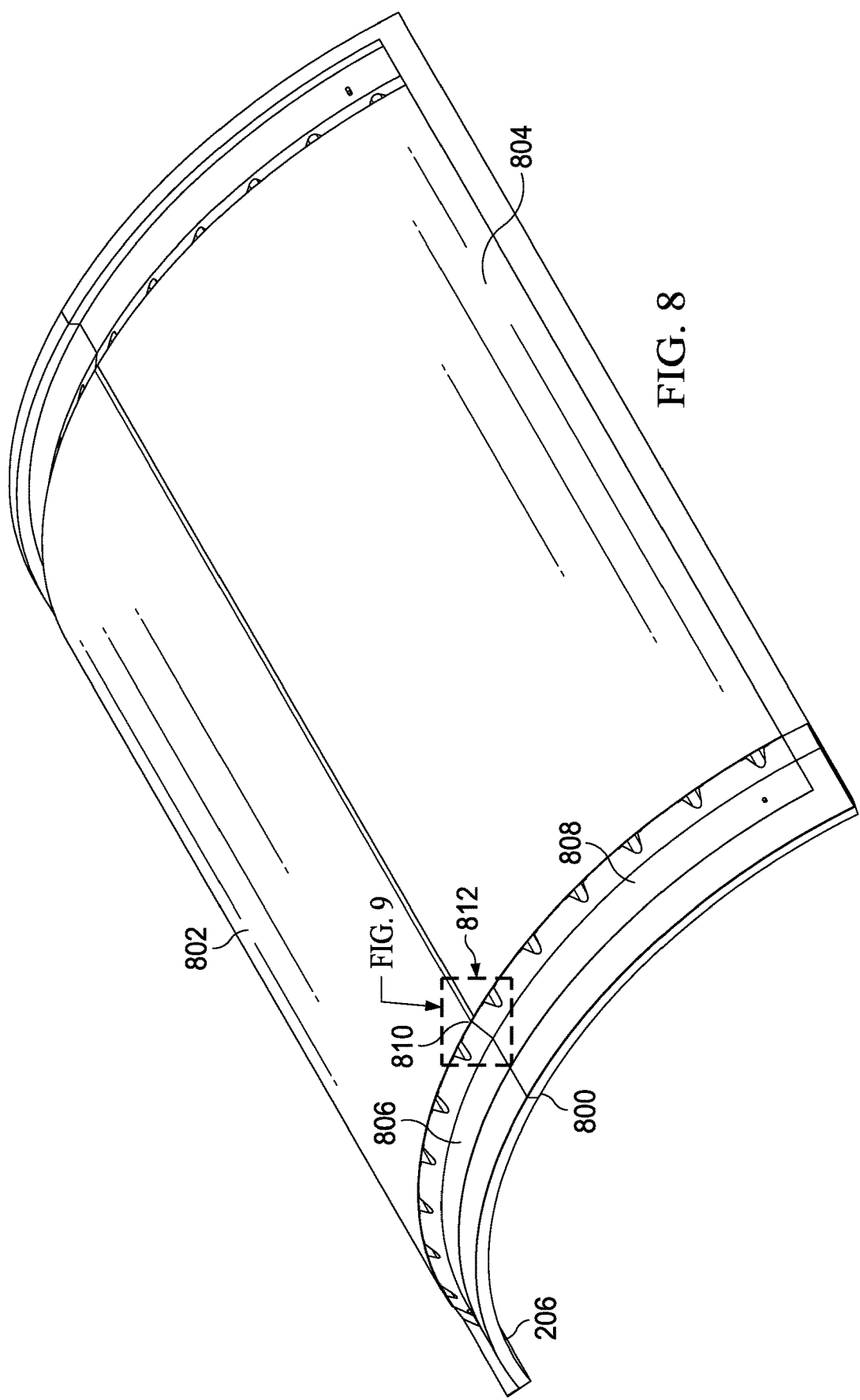

COMPOSITE FUSELAGE FABRICATION

BACKGROUND INFORMATION

1. Field

The present disclosure relates generally to manufacturing system and in particular, to a method, apparatus, and system for manufacturing composite parts. Still more particularly, the present disclosure relates to a method, apparatus, and system for manufacturing composite fuselage sections.

2. Background

The focus on manufacturing aircraft has turned from using metals to composite materials. Composite materials are made from two or more different materials that when combined are stronger than the elements themselves. Many manufacturers are turning to using fiber reinforced composite plastic (FRCP) materials to form various aircraft parts such as fuselages, wings, skin panels, doors, and other aircraft parts. With fiber reinforced composite plastic as a composite material, carbon fibers lock in place with resin providing better strength to weight ratio than metals. Further, fiber reinforced composite plastic structures are lighter as compared to more traditional structures manufactured using aluminum.

In manufacturing composite fuselages, sections of fuselage, such as composite barrels, can be manufactured and joined to form the composite fuselage. The manufacturing of a composite fuselage section involves laying up composite materials on a tool such as a cure mandrel. A cure mandrel is an inner mode line (IML) tool on which composite materials can be laid up and cured to form a composite section. The mandrel may be used to form, for example, a full barrel fuselage section for a fuselage.

The different composite materials placed on the cure mandrel can be composite preforms. These composite preforms can be, for example, stringers, doublers, skin panels, isolation plies, frame fillers, or composite components used to form the full barrel fuselage section. After laying up the composite preforms to form a composite preform assembly, the composite preform assembly can be bagged and heated in a pressurized environment such as an autoclave. This process can cure the preform assembly to form the full barrel fuselage section. The part can be removed and the process of laying up composite preforms can be performed again to manufacture another full barrel fuselage section The amount of time needed to manufacture a full barrel fuselage section may be greater than desired. For example, the amount of time to lay up composite materials, cure composite preform assemblies, and remove and clean cure mandrels may take more time than desired. Increasing the number of cure mandrels available can increase the throughput or production rate of full barrel fuselage sections, but increases the expense for tooling.

Therefore, it would be desirable to have a method and apparatus that take into account at least some of the issues discussed above, as well as other possible issues. For example, it would be desirable to have a method and apparatus that overcome a technical problem with manufacturing composite parts using cure mandrels.

SUMMARY

An embodiment of the present disclosure provides a method for manufacturing a composite part. A set of composite preforms is placed on a set of slip sheets. The set of slip sheets with the set of composite preforms is attached to a cure mandrel to form a composite preform assembly. The composite preform assembly is processed to form the composite part.

Another embodiment of the present disclosure provides a method for composite part fabrication. A set of composite components is placed on a slip sheet. The slip sheet is attached to a cure mandrel. The set of composite components on the slip sheet attached to the cure mandrel is processed to form a composite part.

Yet another embodiment of the present disclosure provides a composite preform apparatus comprising a slip sheet and a cure mandrel. The slip sheet has a composite preform laid up on the slip sheet. The cure mandrel has an attachment location, wherein the slip sheet with the composite preform is attached to the cure mandrel at the attachment location.

Still another embodiment of the present disclosure provides a composite manufacturing system comprising fabrication equipment and a fabrication controller. The fabrication controller is in a computer system that controls fabrication equipment to place a set of composite preforms on a set of slip sheets; attach the set of slip sheets with the set of composite preforms to a cure mandrel to form a composite preform assembly; and process the composite preform assembly to form a composite part.

Another embodiment of the present disclosure provides a composite manufacturing system comprising a computer system and a fabrication controller in the computer system. The fabrication controller controls fabrication equipment to place a set of components for a composite preform on a slip sheet; attach the slip sheet to a cure mandrel; and process the set of components for the composite preform on the slip sheet attached to the cure mandrel to form a composite part.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed to be characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 5 is an illustration of a cross-sectional view of a slip sheet in accordance with an illustrative embodiment;

FIG. 6 is an illustration of a cross-sectional view of support structures laid up on a slip sheet in accordance with an illustrative embodiment;

FIG. 7 is an illustration of a cross-sectional view of a composite preform on a slip sheet in accordance with an illustrative embodiment;

FIG. 8 is an illustration of slip sheets with composite preforms attached to a portion of the cure mandrel in accordance with an illustrative embodiment;

DETAILED DESCRIPTION

The illustrative embodiments recognize and take into account one or more different considerations. For example, the illustrative embodiments recognize and take into account that laying up composite preforms on a cure mandrel can be a time-consuming process that reduces the throughput in manufacturing composite parts. The illustrative embodiments also recognize and take into account that with currently used cure mandrels, a complete cleaning is needed more frequently from the laying up of composite materials on these tools. As a result, the illustrative embodiments recognize and take into account that increasing the throughput on these cure mandrels increase wear-and-tear during the production process.

The illustrative embodiments recognize and take into account that this increase wear-and-tear can reduce the lifecycle resulting in increased tooling costs. Further, the illustrative embodiments recognize and take into account that increase throughput can be achieved through increasing the number of cure mandrels which in turn increases the capital costs for having the number of cure mandrels available to reach a desired throughput.

The illustrative embodiments recognize and take into account that the amount of time that a cure mandrel is used can be reduced through performing some operations such as the laying up of composite materials in another location. The illustrative embodiments recognize and take into account that the composite preforms can be laid up on structures such as slip sheets. The illustrative embodiments recognize and take into account that the slip sheets with the composite preforms can be transported to and attached to the cure mandrel, reducing the amount of time that a was needed to produce a composite part. The illustrative embodiments also recognize and take into account that slip sheets have a lower cost than cure mandrels.

Thus, the illustrative embodiments provide a method, apparatus, and system for manufacturing a composite part. In one illustrative example, a set of composite preforms is placed on a set of slip sheets. The set of slip sheets with the set of with composite preforms is attached to a cure mandrel to form a composite preform assembly. The composite preform assembly on the cure mandrel is processed to form the composite part.

Figure 1:
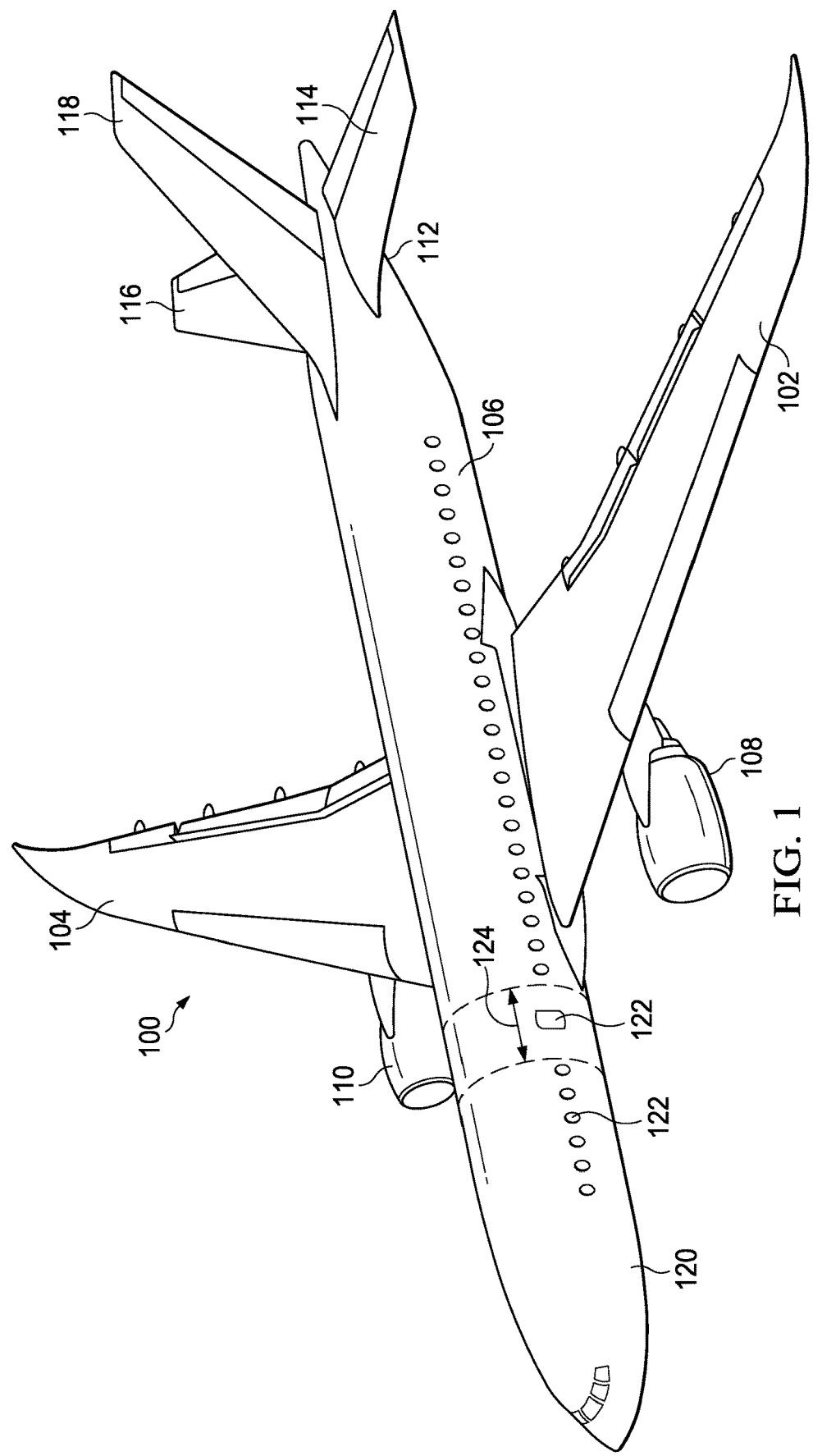
FIG. 1 is an illustration of an aircraft in accordance with an illustrative embodiment.

With reference now to the figures in particular with reference to FIG. 1, an illustration of an aircraft is depicted in accordance with an illustrative embodiment. In this illustrative example, and aircraft 100 has wing 102 and wing 104 attached to fuselage 106. Aircraft 100 includes engine 108 attached to wing 102 and engine 110 attached to wing 104.

Fuselage 106 has tail section 112. Horizontal stabilizer 114, horizontal stabilizer 116, and vertical stabilizer 118 are attached to tail section 112 of fuselage 106.

In the illustrated example, the fuselage 106 is substantially cylindrical in cross-section, however in other examples it may be elliptical or have other similar shapes. In this illustrative example, fuselage 106 can be formed of composite components, including a composite outer skin 120 and typically may have numerous openings 122 therein, such as hatches or windows. Composite outer skin 120 can be a composite laminate such as a carbon fiber reinforced polymer (CFRP). Fuselage 106 can be manufactured in sections, such as fuselage section 124, that are joined to form fuselage 106. Aircraft 100 is an example of an aircraft which may be manufactured in accordance with an illustrative embodiment.

Figure 2:
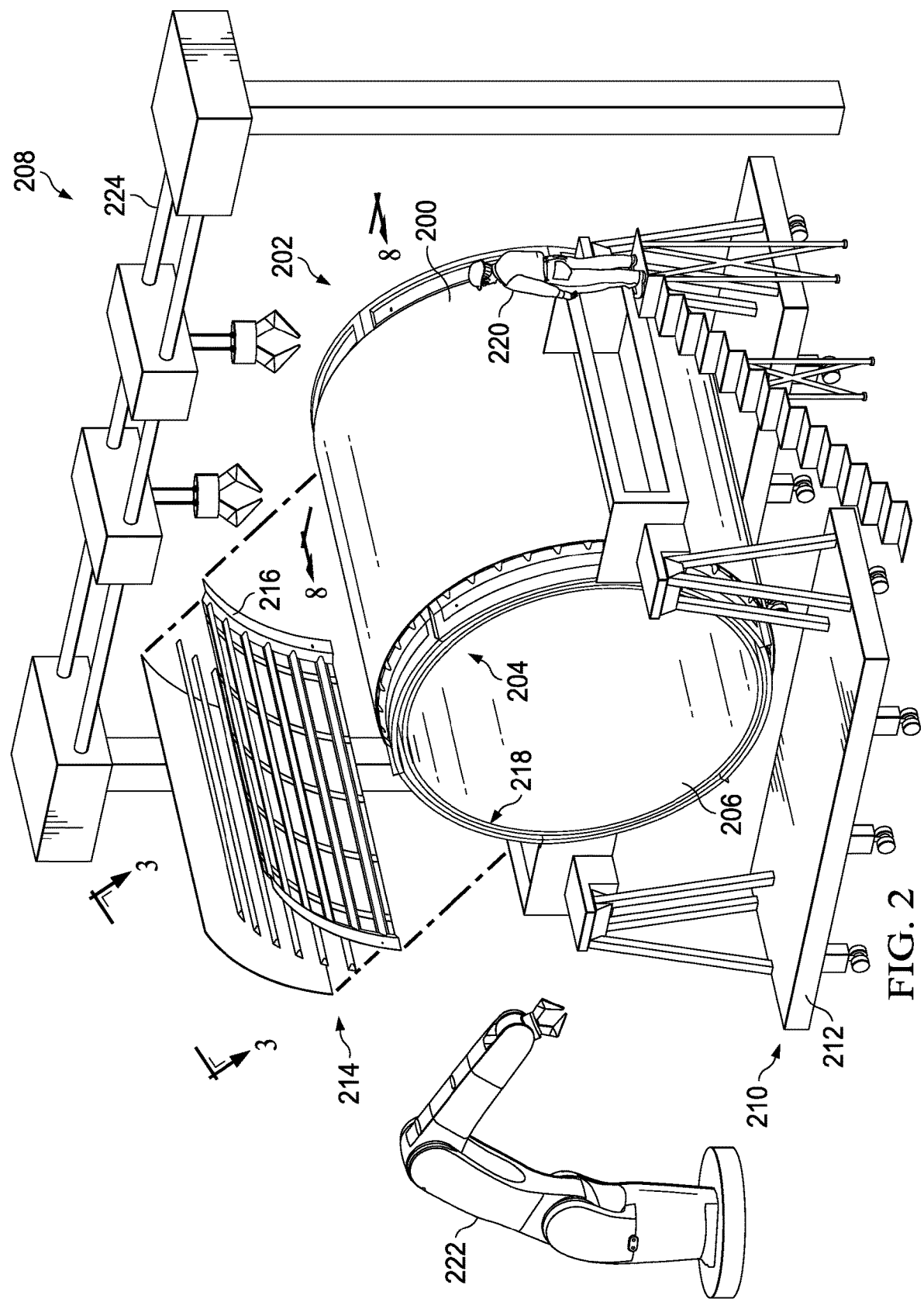
FIG. 2 is an illustration of a layup of composite materials on a cure mandrel in accordance with an illustrative embodiment.

With reference next to FIG. 2, an illustration of a layup of composite materials on a cure mandrel is depicted in accordance with an illustrative embodiment. In this illustrative example, composite preform assembly 200 is an example of a preform assembly that can be processed to form a composite part such as fuselage section 124 in FIG. 1.

In this illustrative example, composite preform assembly 200 is assembled by attaching composite preforms 202 on slip sheets 204 to cure mandrel 206 located in assembly area 208. In this illustrative example, cure mandrel 206 is an inner line (IML) tool. Cure mandrel 206 is part of mandrel system 210, which also includes platform 212. Platform 212 holds cure mandrel 206 and can rotate cure mandrel 206 during the attachment of composite preforms 202 on slip sheets 204 to cure mandrel 206. Platform 212 can be, for example, a cart that transports cure mandrel 206.

As depicted, composite preforms 202 are indirectly attached to cure mandrel 206. In this depicted example, composite preforms 202 are located on slip sheets 204, which are attached to cure mandrel 206.

An exploded view of composite preform 214 in composite preforms 202 and slip sheet 216 in slip sheets 204 are shown. In this illustrative example, composite preform 214 comprises composite materials laid up on slip sheet 216 prior to slip sheet 216 with composite preform 214 being transported to assembly area 208. Composite preform 214 can also include non-composite components such as bladders and surface assembly cauls.

In the illustrative example, slip sheet 216 with composite preform 214 can be attached to portion 218 of cure mandrel 206. In this illustrative example, the attachment of composite preforms 202 to cure mandrel 206 can be performed with the aid human operator 220. Mandrel system 210 can also include at least one of robotic arm 222, overhead gantry crane 224, or other suitable types of automated manufacturing equipment that can operate to attach slip sheets 204 with composite preforms 202 to cure mandrel 206.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, composite preforms 202 can be cured after attachment of slip sheets 204 with composite preforms 202 to cure mandrel 206 to form a composite part in the form of a fuselage section. This curing can occur in assembly area 208 or another location. In this example, the fuselage section is a full barrel fuselage section. In other illustrative examples, cure mandrel 206 can be configured to receive composite preforms 202 to form a portion of a barrel such as half barrel or other type of portion.

As depicted, composite preforms 202 can be laid up on slip sheets 204 in other locations other than in assembly area 208. In other words, composite preforms 202 can be formed on slip sheets 204 in another location other than on cure mandrel 206. These composite preform can then be transported to assembly area 208, where slip sheets 204 with composite preforms 202 are attached to cure mandrel 206 to form composite preform assembly 200.

As depicted, composite preform assembly 200 can be attached to cure mandrel 206 and processed to form a composite part in the form of a fuselage section. This processing includes curing and other operations needed to form the fuselage section. This fuselage section along with other fuselage sections can be joined to form the fuselage of 100 in FIG. 1.

As a result, the time during which mandrel system 210 is unavailable for processing other fuselage sections are reduced as compared to current techniques. This reduction in time occurs because the different preforms can be laid in other locations before transporting those composites preforms to mandrel system 210 for processing to form the fuselage section.

As a result, the time needed to layup composite materials to form composite preforms 202 does not involve mandrel system 210. Further, additional composite preforms can be laid up in another location while composite preforms 202 on slip sheets 204 attached to cure mandrel 206 is being processed. In other words, the laying up of composite materials to form additional composite preforms can be performed in parallel to the processing of composite preforms 202 on slip sheets 204 attached to cure mandrel 206.

Figure 3:
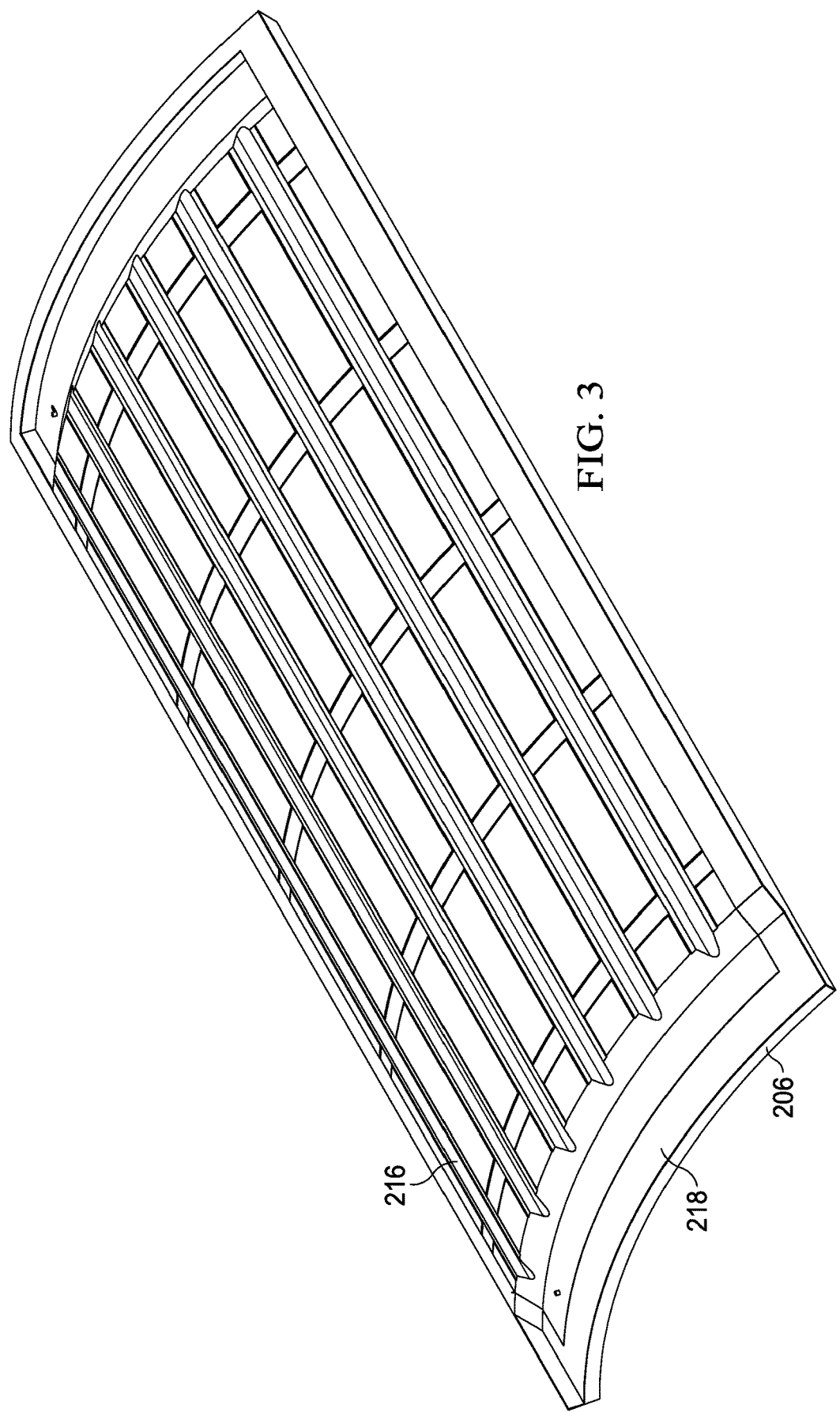
FIG. 3 is an illustration of a slip sheet attached to a cure mandrel in accordance with an illustrative embodiment.

With reference next to FIG. 3, an illustration of a slip sheet attached to a cure mandrel is depicted in accordance with an illustrative embodiment. In the illustrative examples, the same reference numeral may be used in more than one figure. This reuse of a reference numeral in different figures represents the same element in the different figures.

A view of portion 218 of cure mandrel 206 taken along lines 3-3 of cure mandrel 206 in FIG. 2 is shown. As depicted, slip sheet 216 attached to portion 218 of cure mandrel 206.

Figure 4:
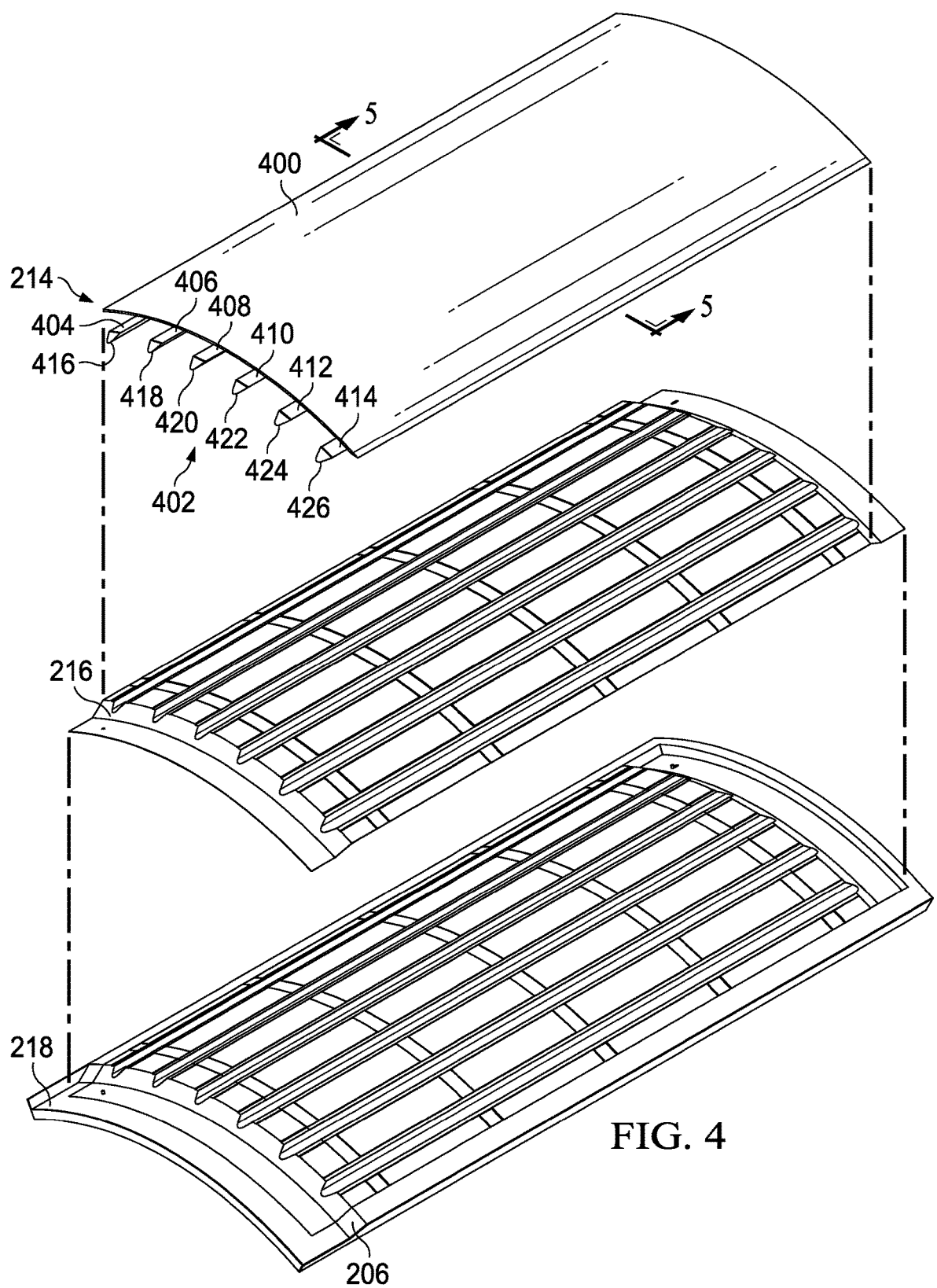
FIG. 4 an illustration of an exploded view of a portion of a cure mandrel with a composite preform and a slip sheet in accordance with an illustrative embodiment.

Turning to FIG. 4, an illustration of an exploded view of a portion of a cure mandrel with a composite preform and a slip sheet is depicted in accordance with an illustrative embodiment. An exploded view of portion 218 of cure mandrel 206 taken along lines 3-3 of cure mandrel 206 in FIG. 2 is shown. In this exploded view, slip sheet 216 and composite preform 214 can be seen.

As depicted in this example, composite preform 214 comprises skin panel 400 and support structures 402. In this example, a set of support structures 402 comprises stringer 404, stringer 406, stringer 408, stringer 410, stringer 412, and stringer 414.

As used herein, a "set of" when used with reference to items means one or more items. For example, a set of support structures 402 is one or more of support structures 402.

In this example, composite preform 214 is laid out on slip sheet 216 prior to transporting composite preform 214 on slip sheet 216 to cure mandrel 206. Slip sheet 216 with composite preform 214 can be attached to portion 218 of cure mandrel 206 along with other preforms in composite preforms 202 (not shown) on slip sheets 204 (not shown) to form composite preform assembly 200 (not shown), which can then be processed to form a composite part (not shown).

Turning next to FIGS. 5-7, illustrations of steps for laying up a composite preform on a slip sheet is depicted in accordance with an illustrative embodiment. Turning first to FIG. 5, an illustration a cross-sectional view of a slip sheet is depicted in accordance with an illustrative embodiment. In this illustrative example, a cross-sectional view of slip sheet 216 is shown taken along lines 5-5 in FIG. 4. As depicted in this example, composite materials (not shown) can be laid up on surface 500 of slip sheet 216. The steps can be performed prior to attaching slip sheet 216 to cure mandrel 206 in FIG. 2.

In this illustrative example, slip sheet 216 can be a solid sheet having a curved shape. In other illustrative examples, a slip sheet can be a frame that can have openings. Slip sheet 216 can be comprised of a set material selected from at least one of a metal, a metal alloy, a composite material, or some other suitable material. The set materials selected for slip sheet 216 can be selected to from a set of materials that have a thermal coefficient of expansion that is within a selected tolerance of the coefficient of thermal expansion for the composite preform (not shown) that is laid up on slip sheet 216.

Turning next to FIG. 6, an illustration of a cross-sectional view of support structures laid up on a slip sheet is depicted in accordance with an illustrative embodiment. A set of support structures 402 in the form of stringer 404, stringer 406, stringer 408, stringer 410, stringer 412, and stringer 414 for support structures 402 of composite preform 214 are laid up on surface 500 of slip sheet 216. Other types of support structures 402 can be used in addition to or in place of stringers in this example. Support structures 402 for composite preform 214 can be selected from at least one of a one of a ply, an isolation ply, a frame filler, a stringer, a doubler, a caul, an inner surface assembly (ISA) caul, or some other suitable support structure. In the illustrative examples, one or more support structures 402 do not necessarily become part of the composite part but can be removed during or after formation composite part.

With reference to FIG. 7, an illustration of a cross-sectional view of a composite preform on a slip sheet is depicted in accordance with an illustrative embodiment. In this figure, skin panel 400 is laid up after laying up the set of support structures 402 of composite preform 214 on slip sheet 216. This composite preform is a composite skin panel preform. Slip sheet 216 with composite preform 214 can then be attached to portion 218 of cure mandrel 206 (not shown in this figure).

As a result, the operations for laying up composite components to form composite preform 214 can be performed without needing cure mandrel 206. Instead, composite preforms 202 can be formed ahead of time and attached to cure mandrel 206 to form composite preform assembly 200 when cure mandrel 206 is available. In other words, if cure mandrel 206 is currently being used to cure another composite preform assembly, the forming of composite preforms 202 is not delayed.

Further, composite preforms 202 can be formed in parallel data avoiding limitations of current techniques in which the forming of composites can be limited based on the current orientation of a cure mandrel. Thus, the amount of time that cure mandrel 206 is used to form a composite part can be reduced through laying up composite materials to form composite preforms 202 without needing cure mandrel 206 until composite preforms 202 on slip sheets 204 are ready to be attached to cure mandrel 206 to complete composite preform assembly 200 for further processing to form a composite part.

Further, many composite preforms, such as composite preform 214 can be laid up on numerous slip sheets in parallel. Further, composite preforms 202 can be laid up ahead of time while cure mandrel 206 is being used to form another composite part. In this manner, cure mandrel 206 does not become a bottleneck with respect to laying up composite preforms 202 to form composite preform assembly 200. As a result, a throughput of forming composite parts can be increased by forming composite preforms 202 on slip sheets 204.

Turning next to FIG. 8, an illustration of with slip sheets with composite preforms attached to a portion of the cure mandrel is depicted in accordance with an illustrative embodiment. A view taken of portion 800 of cure mandrel 206 with composite preform 802, composite preform 804, slip sheet 806, and adjacent slip sheet 808 is shown in the direction lines 8-8 in FIG. 2.

In this illustrative example, composite preform 802 has been laid up on slip sheet 806, and composite preform 804 has been laid up on adjacent slip sheet 808. As depicted, slip sheet 806 with composite preform 802 and adjacent slip sheet 808 with composite preform 804 are illustrated as attached to portion 800 of cure mandrel 206.

In this illustrative example, splice 810 is present between composite preform 802 and composite preform 804 in section 812.

Figure 9:
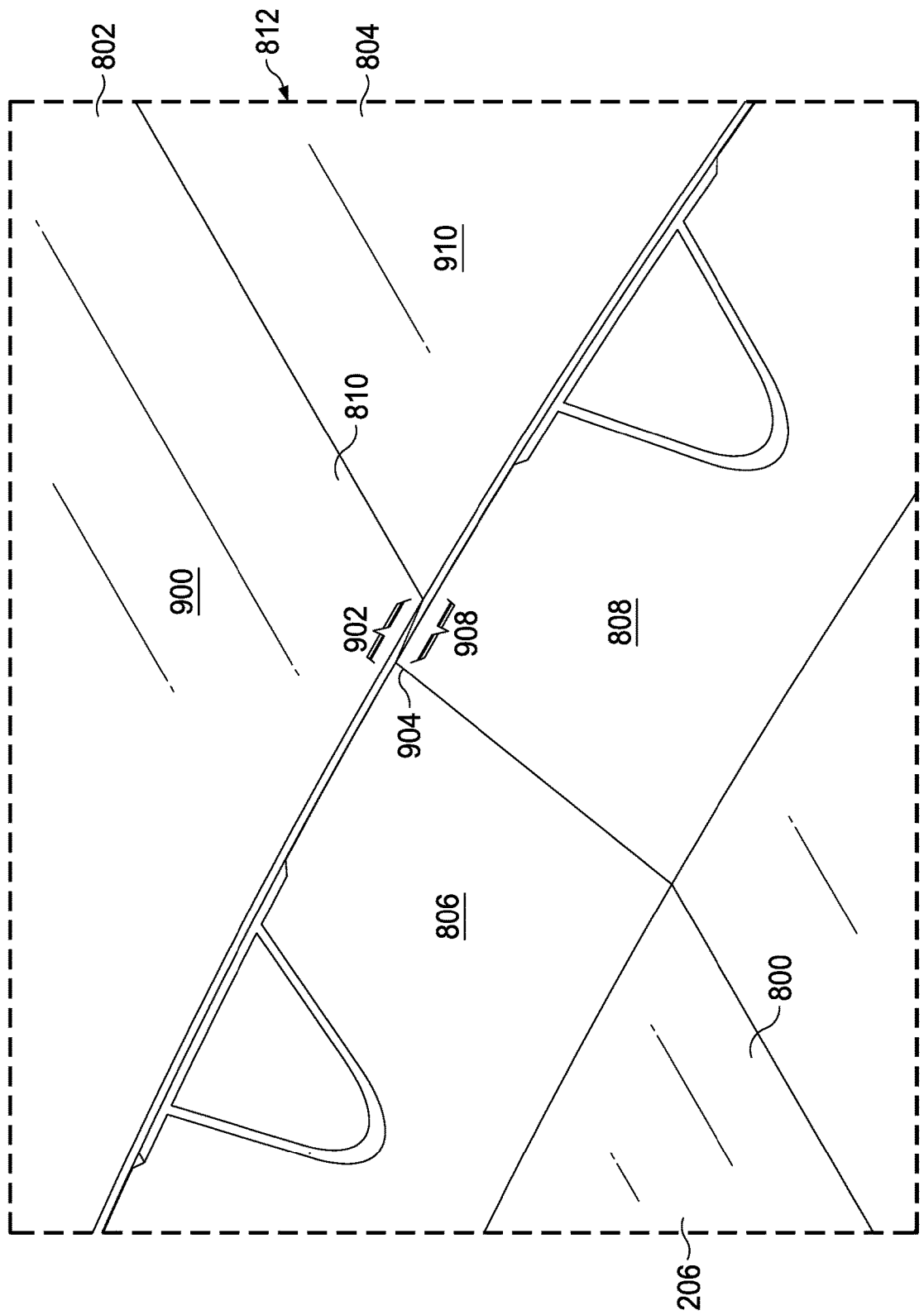
FIG. 9 is a more detailed illustration of a splice between composite preforms in accordance with an illustrative embodiment.

Now to FIG. 9, a more detailed illustration of a splice between composite preforms is depicted in accordance with an illustrative embodiment. In this illustrative example, a more detailed view of section 812 in FIG. 8 is shown.

As depicted, skin panel 900 in composite preform 802 has splice region 902. As depicted, splice region 902 extends beyond edge 904 of slip sheet 806 in this illustrative example. In other words, splice region 902 is the portion of skin panel 900 that extends beyond edge 904 of slip sheet 806. Splice region 902 can also be referred to as first splice region 906 that overlaps second splice region 908 in adjacent skin panel 910 in composite preform 802 adjacent to skin panel 900 in composite preform 804. In other words, first splice region 906 does not necessarily always extend beyond edge 904 of slip sheet 806 depending on the configuration of slip sheet 806 and adjacent slip sheet 808 at edge 904. This adjacency is present when slip sheet 806 and adjacent slip sheet 808 are adjacent to each other when attached to portion 800 of cure mandrel 206.

Figure 10:
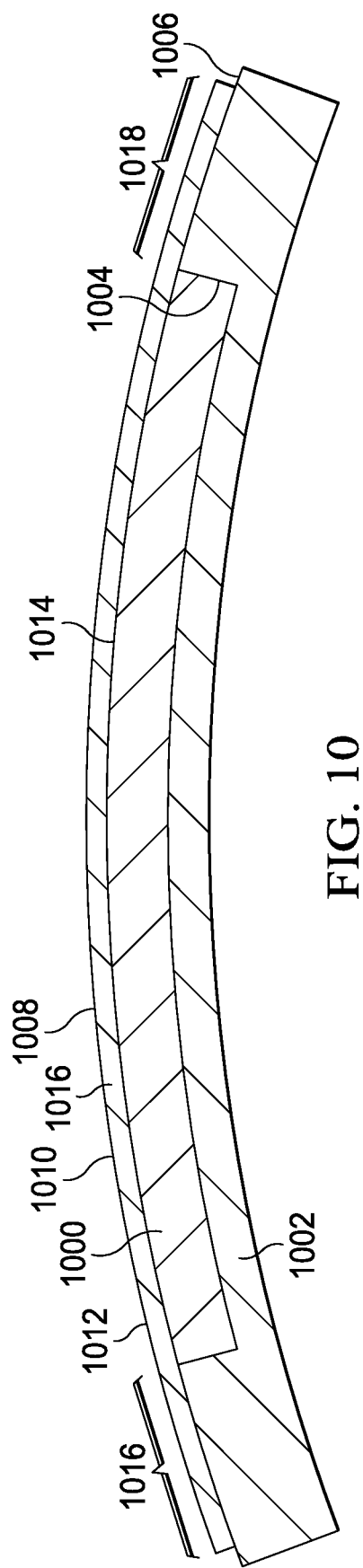
FIG. 10 is an illustration of a side view of a composite preform laid up on a slip sheet located on a support tool in accordance with an illustrative embodiment.

Turning to FIG. 10, an illustration of a side view of a composite preform laid up on a slip sheet located on a support tool is depicted in accordance with an illustrative embodiment. Slip sheet 1000 is located on support tool 1002 in this example. As depicted, slip sheet 1000 sits in channel 1004 on surface 1006 of support tool 1002.

In this illustrative example, composite preform 1008 comprises a composite component 1010 in the form of skin panel 1012. As depicted, skin panel 1012 lays on surface 1014 of slip sheet 1000 and surface 1006 of support tool 1002. In this depicted example, portion 1016 and portion 1018 of skin panel 1012 are on surface 1006 of support tool 1002.

Support tool 1002 can be used when slip sheet 1000 provides a desired level of rigidity for laying up composite preform 1008. Support tool 1002 can have a design that results in any components in composite preform 1008 staying a desired configuration or in place during at least one of transport, attachment, or curing operations. Support tool 1002 can be comprised of various materials selected from at least one of a metal, a metal alloy, a plastic, a composite material, or some combination thereof.

Figure 11:
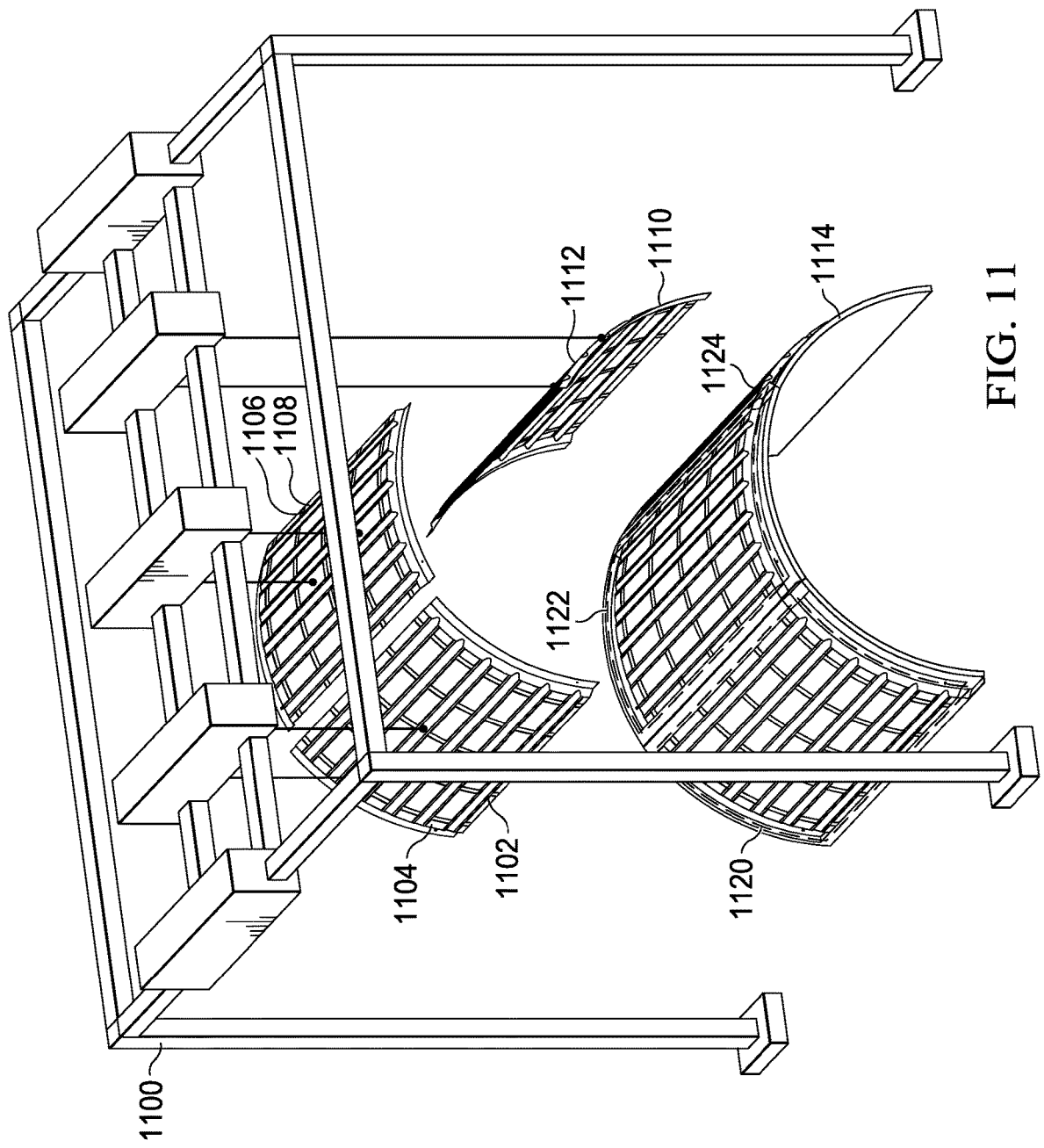
FIG. 11 is an illustration of an overhead gantry crane for positioning slip sheets with composite preforms on the cure mandrel in accordance with an illustrative embodiment.

Turning to FIG. 11, an illustration of an overhead gantry crane for positioning slip sheets with composite preforms on the cure mandrel is depicted in accordance with an illustrative embodiment. As depicted, overhead gantry crane 1100 can position slip sheet 1102 with composite preform 1104, slip sheet 1106 with composite preform 1108, and slip sheet 1110 with composite preform 1112 with respect to cure mandrel 1114. This positioning can be performed to place slip sheet 1102 with composite preform 1104, slip sheet 1106 with composite preform 1108, and slip sheet 1110 with composite preform 1112 for attachment to cure mandrel 1114.

In this illustrative example, the slip sheets can be attached to cure mandrel 1114 having attachment locations. As depicted, cure mandrel 1114 has attachment location 1120, attachment location 1122, and attachment location 1124. In this illustrative example, slip sheet 1102 with composite preform 1104 can be attached to cure mandrel 1114 at attachment location 1120, and slip sheet 1106 with composite preform 1108 can be attached to cure mandrel 1114 at attachment location 1122. Further, slip sheet 1110 with composite preform 1112 can be attached to cure mandrel 1114 at attachment location 1124.

In this illustrative example, the positioning of these components is part of a half barrel assembly process manufacturing a fuselage, such as fuselage 106 for aircraft 100 in FIG. 1. With this implementation, rotation of cure mandrel 1114 is unnecessary in positioning and attaching slip sheets to cure mandrel 1114. As a result, slip sheet 1102 with composite preform 1104, slip sheet 1106 with composite preform 1108, and slip sheet 1110 with composite preform 1112 can be positioned and attached with cure mandrel 1114 in a vertical orientation. This enables using a simpler configuration for overhead gantry crane 1100, increasing geometric stability during installation of the slip sheets. In other illustrative examples, the curing mandrel can be configured for manufacturing a full barrel, quarter barrel, or other portion of a fuselage.

Figure 12:
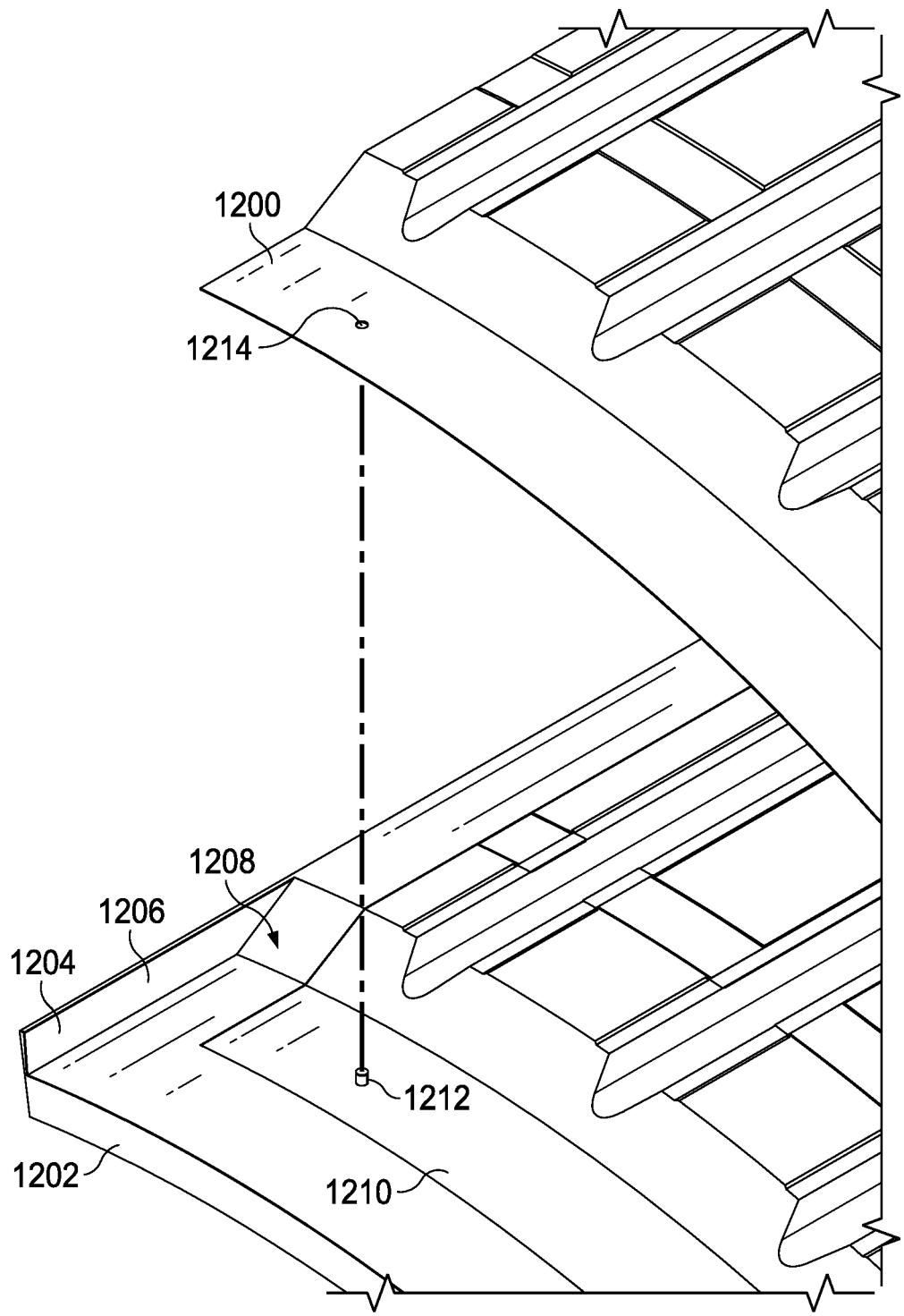
FIG. 12 is an illustration of a connection system for a slip sheet in accordance with an illustrative embodiment.

In FIG. 12, an illustration of a connection system for a slip sheet is depicted in accordance with an illustrative embodiment. This illustrative example, slip sheet 1200 can be connected to tooling structure 1202, which can be cure mandrel 1204 or support tool 1206.

As depicted, tooling structure 1202 has connection system 1208 which includes channel 1210 that is configured to receive slip sheet 1200. Further, connection system 1208 also comprises a pin and hole system including pin 1212 located on tooling structure 1202 and hole 1214 located in slip sheet 1200.

When slip sheet 1200 is placed into channel 1210 such that pin 1212 receives hole 1214, slip sheet 1200 is connected to tooling structure 1202, which can be cure mandrel 1204 or support tool 1206.

Figure 13:
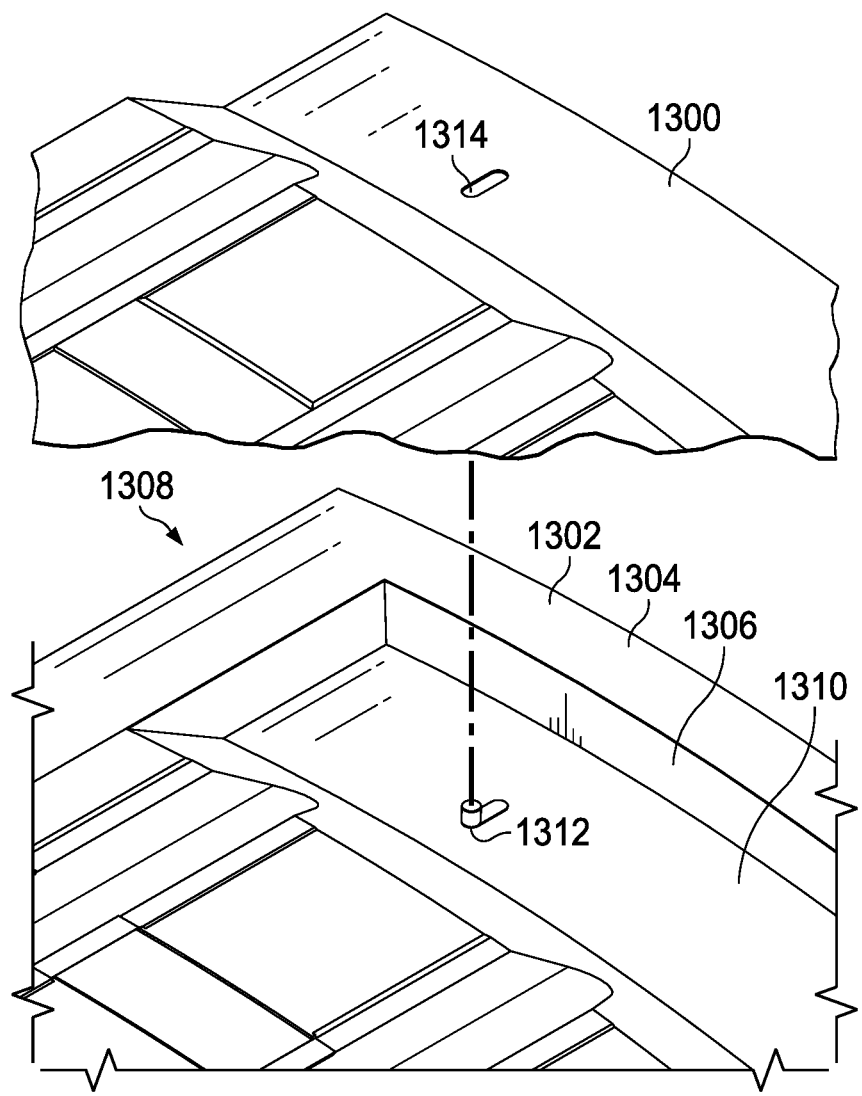
FIG. 13 is an illustration of a connection system for a slip sheet in accordance with an illustrative embodiment.

Turning to FIG. 13, an illustration of a connection system for a slip sheet is depicted in accordance with an illustrative embodiment. This illustrative example, slip sheet 1300 can be connected to tooling structure 1302, which can be cure mandrel 1304 or support tool 1306.

As depicted, tooling structure 1302 has connection system 1308 which includes channel 1310 that is configured to receive slip sheet 1300. Further, connection system 1308 also comprises a key pin and key slot system including key pin 1312 located on tooling structure 1302 and key slot 1314 located in slip sheet 1300.

The illustration of connection system 1208 in FIG. 12 and connection system 1308 in FIG. 13 are provided as example illustrations for one implementation of a connection system and not meant to limit the manner in which other connection systems can be implemented. For example, pinhole systems or key slot systems can be omitted in other illustrative examples. Further, in yet other illustrative examples other types of clamps can be used. In yet other illustrative examples, at least one of a magnet attachment system or a vacuum system can be used in addition or in place of a physical locking system as depicted in these figures.

Figure 14:
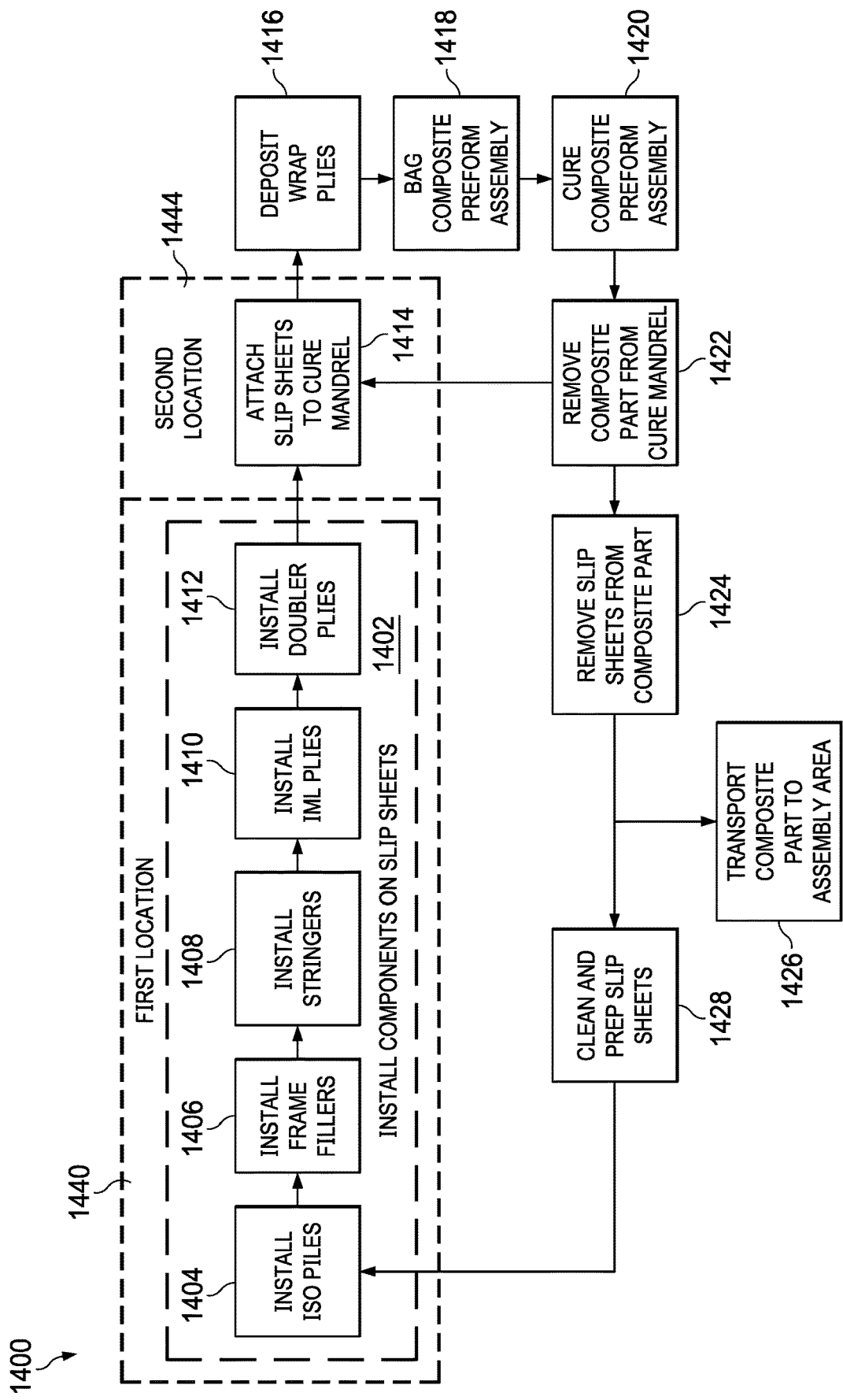
FIG. 14 is an illustration of a workflow process for manufacturing fuselage sections in accordance with an illustrative embodiment.

With reference FIG. 14, an illustration of a workflow process for manufacturing fuselage sections is depicted in accordance with an illustrative embodiment. As depicted, workflow process 1400, begins with installing components on slip sheets (operation 1402). These components can include composite components and non-composite components. In this illustrative example, installing components on the slip sheets includes installing isolation (ISO) ply (operation 1404) in which one or more isolation plys are placed onto slip sheets. The process installs frame fillers (operation 1406). Next, the process installs stringers (operation 1408). The process installs IML plies (operation 1410). This operation can involve placing inner mold line plies onto the components already installed on the slip sheets. The process installs doubler plies (operation 1412). The placement of these components results in the formation of composite preforms on the slip sheets. The doubler plies can be used to provide a desired level of stiffness or strength for the composite part.

The illustration of the different components are provided for purposes of illustrating examples of some components that can be placed onto the slip sheets to create composite preforms. Other components can be used in place of or in addition to these components in other process workflows. For example, doubler ply installation can be omitted in other implementations. In yet other illustrative examples, a non-composite component, such as a caul, can be installed during the installation of components on the slip sheets.

The process then attaches the slip sheets to the cure mandrel (operation 1414). The process then deposits wrap plies (operation 1416). In operation 1416, additional plies can be wrapped around the composite preforms on the slip sheets attached the cure mandrel using automated equipment such as an automatic fiber placement (AFP) machine.

The process then bags the composite preform assembly of composite components on the slip sheets attached to the cure mandrel (operation 1418). The process cures the composite preform assembly (operation 1420).

After curing, the composite part is removed from the cure mandrel (operation 1422). The process then removes the slip sheets from the composite part (operation 1424). The process then transports the composite part to an assembly area (operation 1426). The composite part can then be used in the assembly of an aircraft or other platform.

From operation 1424, the process cleans and preps the slip sheets for the installation of components (operation 1428). The process then returns to operation 1404.

This illustrative example, operations performed in installing components on the slip sheets in operation 1402 can be performed in first location 1440, which can be referred to as a preform assembly area. The slip sheets with the composite preforms can be transported to second location 1444 for attachment to the cure mandrel. As a result, operation 1414 can be performed in second location 1444 without or needing the cure mandrel in second location 1444. For example, a composite preform assembly with composite preforms on another set of slip sheets can be cured on the cure mandrel in second location 1444 while the slip sheets are processed in operation 1402. In other words, these processes creating composite preforms on slip sheets and curing composite preform assemblies on a curing mandrel can occur in parallel.

Further, other operations such as operation 1416, operation 1418, operation 1420, operation 1422, operation 1424, and operation 1428 can be performed in second location 1444. In other illustrative examples, one or more these operations can be performed in other locations depending on the particular implementation.

Figure 15:
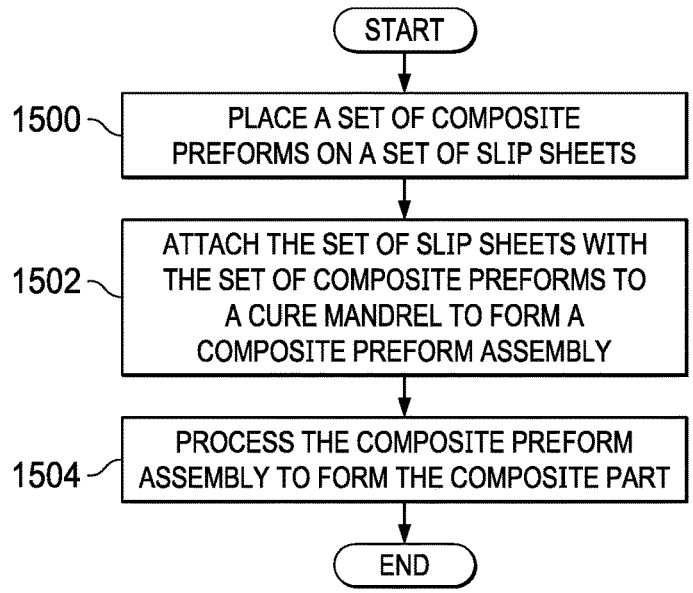
FIG. 15 is an illustration of a flowchart of a process for manufacturing a composite part in accordance with an illustrative embodiment.

Turning next to FIG. 15, an illustration of a flowchart of a process for manufacturing a composite part is depicted in accordance with an illustrative embodiment. The process has operations performed for composite part fabrication. The process in FIG. 15 can be implemented in hardware, software, or both. When implemented in software, the process can take the form of program code that is run by one of more processor units located in one or more hardware devices in one or more computer systems that can control machines such as fabrication equipment.

The process begins by placing a set of composite preforms on a set of slip sheets (operation 1500). In operation 1500, the placing of the set of composite preforms on the set of slip sheets can involve multiple operations in which different components of the set of composite preforms are placed onto the slip sheet. For example, a ply can be laid up on a slip sheet. Support structures such as doublers, stringers, frame fillers, or other components can be placed on the ply. Thereafter, another ply or skin panel can be laid up on the support structures to complete the composite preform. These operations can be the manner in which a composite preform is placed on the slip sheet. In other illustrative examples, a completed composite preform can be placed on the slip sheet in one operation.

The process attaches the set of slip sheets with the set of composite preforms to a cure mandrel to form a composite preform assembly (operation 1502). In operation 1502, the set of slip sheets can be comprised of a number of different materials. For example, the set of slip sheets can be comprised of a set of materials selected to have a first coefficient of thermal expansion that is within a selected tolerance of a second coefficient of thermal expansion for a composite preform.

The process processes the composite preform assembly to form the composite part (operation 1504). The process terminates thereafter.

Figure 16:
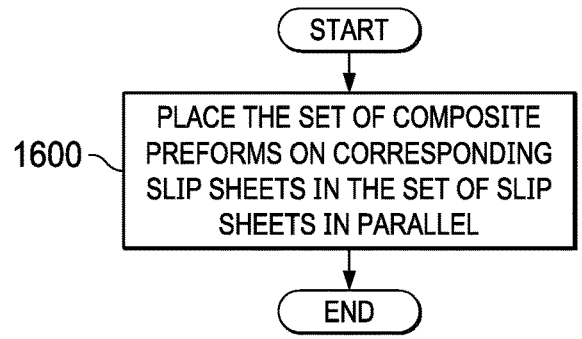
FIG. 16 is an illustration of a flowchart of a process for placing composite preforms in accordance with an illustrative embodiment.

With reference to FIG. 16, an illustration of a flowchart of a process for placing composite preforms is depicted in accordance with an illustrative embodiment. The process illustrated in FIG. 16 is an example of an operation that can be performed with the operations in FIG. 15.

The process places the set of composite preforms on corresponding slip sheets in the set of slip sheets in parallel (operation 1600). The process terminates thereafter.

Figure 17:
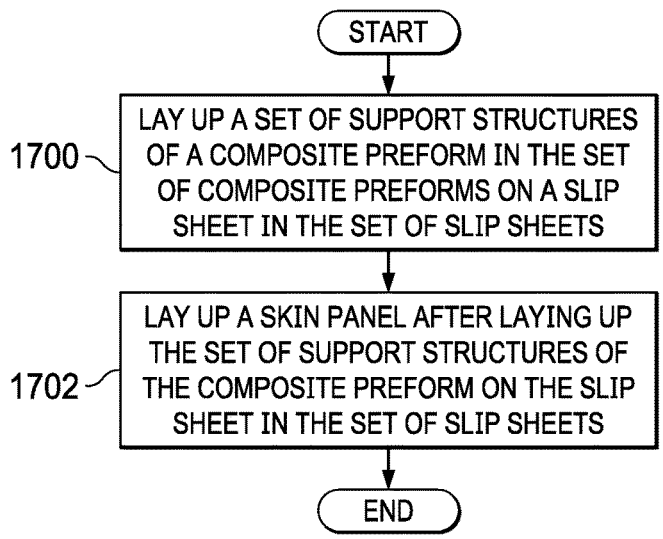
FIG. 17 is an illustration of a process for placing composite preforms in accordance with an illustrative embodiment.

With reference now to FIG. 17, an illustration of a process for placing composite preforms is depicted in accordance with an illustrative embodiment. The process in FIG. 17 is an example of one implementation for operation 1500 in FIG. 15.

The process begins by laying up a set of support structures of a composite preform in the set of composite preforms on a slip sheet in the set of slip sheets (operation 1700). In operation 1700, the set of support structures can take a number of different forms. For example, the set of support structures can be selected from at least one of a support structure, an isolation ply, a ply, a skin panel, a frame filler, a stringer, a doubler, a caul, an inner surface assembly (ISA) caul, or other suitable support structure.

Further, the support structures can be composite components or can be non-composite components. For example, non-composite components such as metal rods, plastic frames, or other suitable components can be used as support structures. As another example, a non-composite support structure can be a caul plate that is laid up with other composite components.

The process lays up a skin panel after laying up the set of support structures of the composite preform on the slip sheet in the set of slip sheets (operation 1702). The process terminates thereafter.

Figure 18:
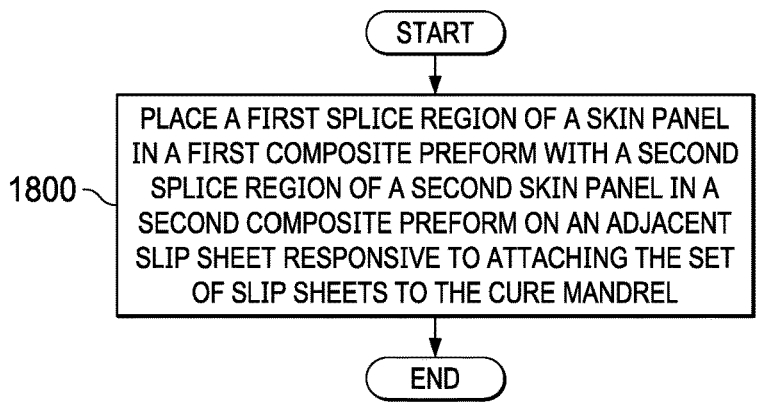
FIG. 18 is an illustration of a flowchart of a process for splicing skin panels in accordance with an illustrative embodiment.

Turning next to FIG. 18, an illustration of a flowchart of a process for splicing skin panels is depicted in accordance with an illustrative embodiment. The process in FIG. 18 is an example of an additional operation that can be performed in addition to the operations in FIG. 15.

The process places a first splice region of a skin panel in a first composite preform with a second splice region of a second skin panel in a second composite preform on an adjacent slip sheet responsive to attaching the set of slip sheets to the cure mandrel (operation 1800). The process terminates thereafter.

Figure 19:
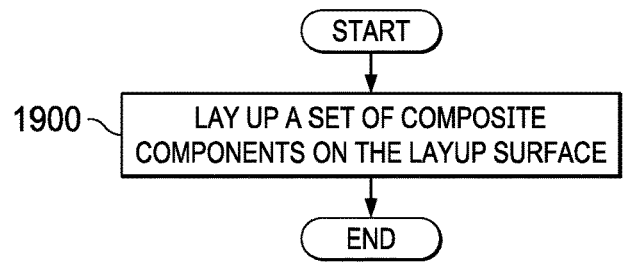
FIG. 19 is an illustration of a flowchart of a process for laying up composite components in accordance with an illustrative embodiment.

With reference to FIG. 19, an illustration of a flowchart of a process for laying up composite components is depicted in accordance with an illustrative embodiment. The process illustrated in FIG. 19 is an example of additional operations that can be performed with the operations depicted in FIG. 15.

In this example, the set of composite preforms on the set of slip sheets form a layup surface when the set of slip sheets is attached to the cure mandrel. The process lays up a set of composite components on the layup surface (operation 1900). The process terminates thereafter).

As depicted by this process, some composite components can be laid up after the slip sheets with composite preforms are attached to the cure mandrel. The composite components can be selected from at least one of wherein the set of composite components comprises at least one of a support structure, an isolation ply, a ply, a skin panel, a frame, a frame filler, a stringer, a doubler, a caul, or an inner surface assembly (ISA) caul, or other suitable structures. For example, support structures can be laid up to form the composite preforms that preform or define a layup surface. Once the slip sheets with the composite preforms are attached to the cure mandrel, additional composite components such as skin panels can be laid up on the layup surface formed by these composite preforms. In another example, a single ply can be laid up along with the support structures with additional plies for a skin panel being laid up on the layup surface formed when the slip sheets with the composite preforms are attached to the cure mandrel.

Figure 20:
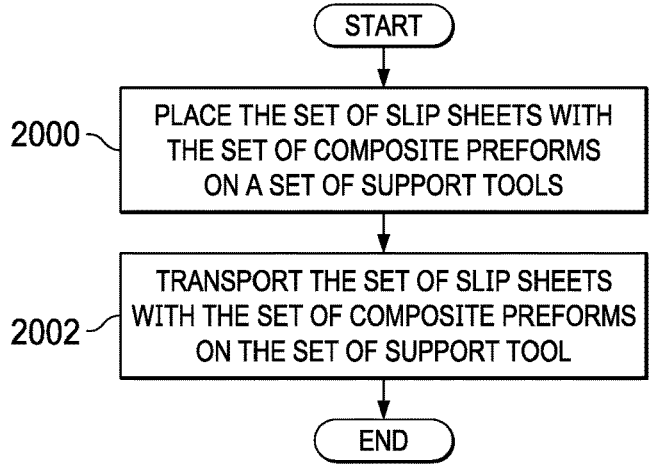
FIG. 20 is an illustration of a flowchart of a process for using support tools in accordance with an illustrative embodiment.

Turning to FIG. 20, an illustration of a flowchart of a process for using support tools is depicted in accordance with an illustrative embodiment. The process in FIG. 20 is an example of an additional operation that can be performed in addition to the operations in FIG. 15.

The process begins by placing the set of slip sheets with the set of composite preforms on a set of support tools (operation 2000). The process transports the set of slip sheets with set of composite preforms on the set of support tool (operation 2002). The process terminates thereafter. In another illustrative example, the slip sheets can be placed on support tools prior to placing the set of preforms on the set of slip sheets.

Figure 21:
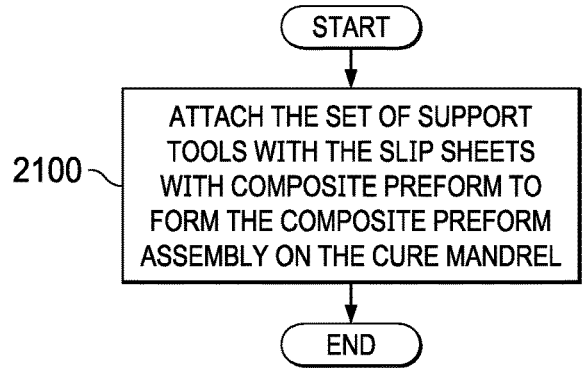
FIG. 21 is an illustration of a flowchart of a process for using support tools in accordance with an illustrative embodiment.

With reference now to FIG. 21, an illustration of a flowchart of a process for using support tools is depicted in accordance with an illustrative embodiment. The operation in FIG. 21 is an example of an implementation for operation 1502 in which support tools are used with slip sheets.

The process attaches the set of support tools with the slip sheets with composite preform to form the composite preform assembly on the cure mandrel (operation 2100). The process terminates thereafter.

Figure 22:
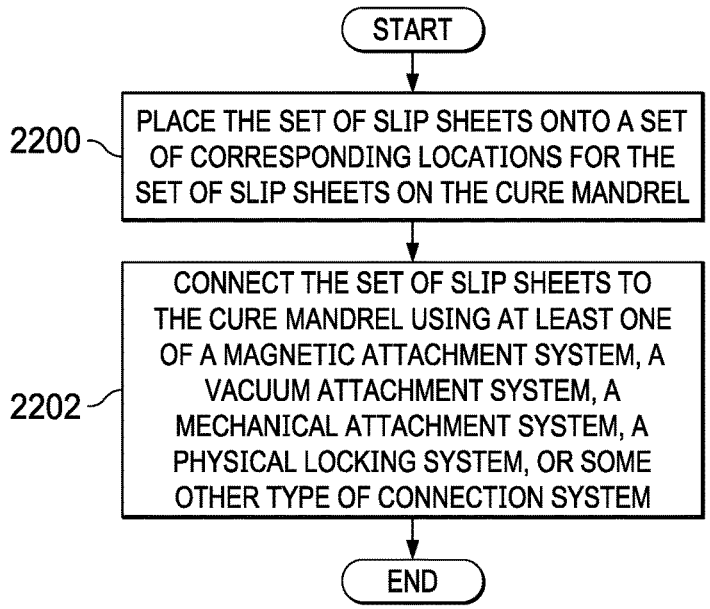
FIG. 22 is an illustration of a flowchart of a process for attaching in accordance with an illustrative embodiment.

Turning now to FIG. 22, an illustration of a flowchart of a process for attaching is depicted in accordance with an illustrative embodiment. The process illustrated in FIG. 22 is an example of one implementation for operation 1502 in FIG. 15.

The process places the set of slip sheets onto a set of corresponding locations for the set of slip sheets on the cure mandrel (operation 2200). The process connects the set of slip sheets to the cure mandrel using at least one of a magnetic attachment system, a vacuum attachment system, mechanical attachment system, a physical locking system, or some other type of connection system (operation 2202). The process terminates thereafter.

Figure 23:
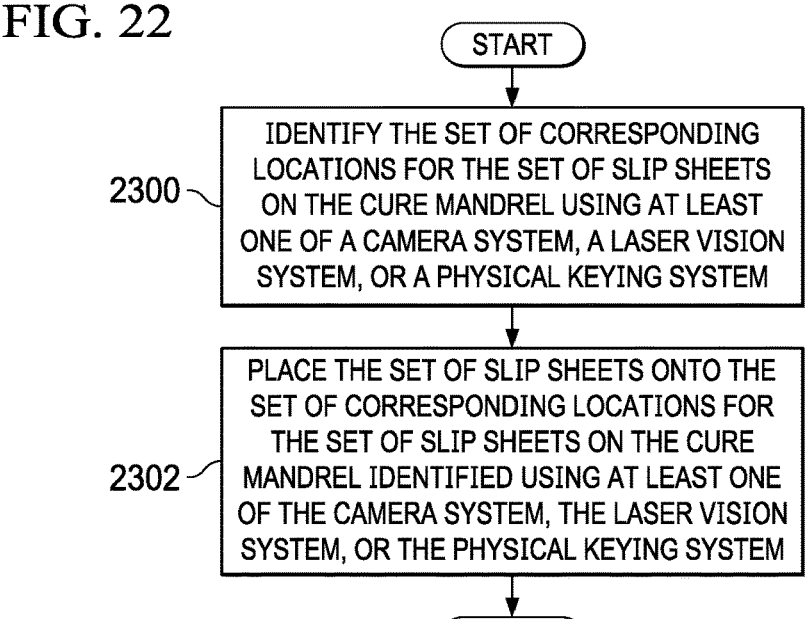
FIG. 23 is an illustration of a flowchart of a process for placing slip sheets on a cure mandrel in accordance with an illustrative embodiment.

In FIG. 23, an illustration of a flowchart of a process for placing slip sheets on a cure mandrel is depicted in accordance with an illustrative embodiment. The process in FIG. 23 is an example of one implementation for operation 1500 in FIG. 15.

The process begins by identifying the set of corresponding locations for the set of slip sheets on the cure mandrel using at least one of a camera system, a laser vision system, or a physical keying system (operation 2300). The process places the set of slip sheets onto the set of corresponding locations for the set of slip sheets on the cure mandrel identified using at least one of the camera system, the laser vision system, or the physical keying system (operation 2302). The process terminates thereafter.

Figure 24:
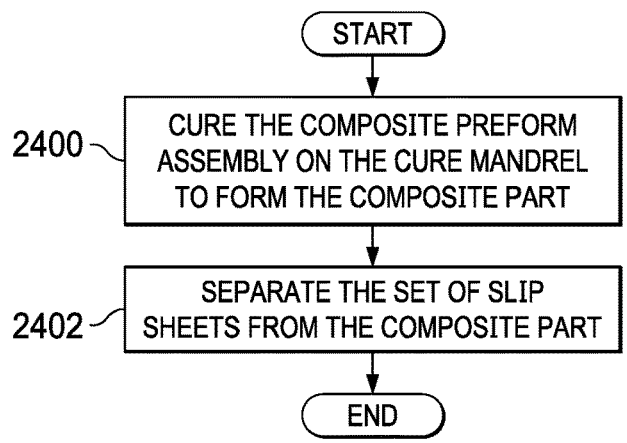
FIG. 24 is an illustration of a flowchart of a process for processing a preform assembly in accordance with an illustrative embodiment.

Turning to FIG. 24, an illustration of a flowchart of a process for processing a preform assembly is depicted in accordance with an illustrative embodiment. The process in FIG. 24 is an example of one implementation for operation 1504 in FIG. 15.

The process cures the composite preform assembly on the cure mandrel to form the composite part (operation 2400). The process separates the set of slip sheets from the composite part (operation 2402).

Figure 25:
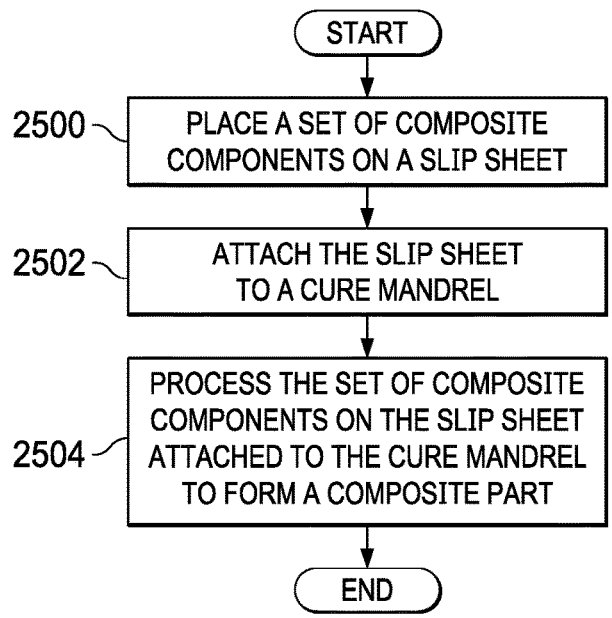
FIG. 25 is an illustration of a flowchart of a process for manufacturing a composite part in accordance with an illustrative embodiment.

Turning next to FIG. 25, an illustration of a flowchart of a process for manufacturing a composite part is depicted in accordance with an illustrative embodiment. The process in FIG. 25 can be implemented in hardware, software, or both. When implemented in software, the process can take the form of program code that is run by one of more processor units located in one or more hardware devices in one or more computer systems. When implemented in software, the process can take the form of program code that is run by one of more processor units located in one or more hardware devices in one or more computer systems that can control machines such as fabrication equipment.

The process begins by placing a set of composite components on a slip sheet (operation 2500). The process attaches the slip sheet to a cure mandrel (operation 2502). The process processes the set of composite components on the slip sheet attached to the cure mandrel to form a composite part (operation 2504). The process terminates thereafter.

In operation 2504, the set of composite components on the slip sheet can form a composite part. In another illustrative example, additional sets of composite components on additional slip sheets can be attached to the curing mandrel along with the set of composite components on the slip sheet. These different sets of composite components can be cured to form the composite part.

Figure 26:
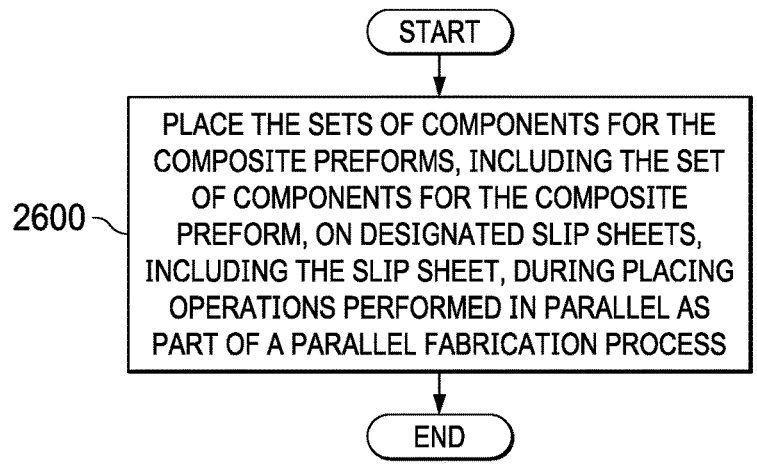
FIG. 26 is an illustration of a flowchart of a process for manufacturing a composite part in accordance with an illustrative embodiment.

With reference now to FIG. 26, an illustration of a flowchart of a process for manufacturing a composite part is depicted in accordance with an illustrative embodiment. The process in FIG. 26 is an example of an operation that can be performed with the operations in FIG. 25.

In this example, the set of composite components on the slip sheet is part of a plurality of sets of components for composite preforms; the slip sheet is part of a plurality of slip sheets.

The process places placing the sets of components for the composite preforms, including the set of components for the composite preform, on designated slip sheets, including the slip sheet, during placing operations performed in parallel as part of a parallel fabrication process (operation 2600). The process terminates thereafter.

Figure 27:
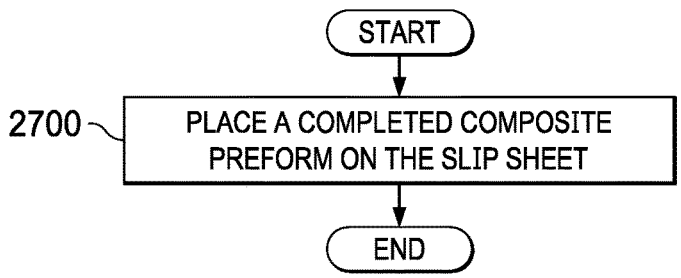
FIG. 27 is an illustration of a flowchart of a process for manufacturing a composite part in accordance with an illustrative embodiment.

With reference now to FIG. 27, an illustration of a flowchart of a process for manufacturing a composite part is depicted in accordance with an illustrative embodiment. The process in FIG. 27 is an example of an implementation for operation 2500 in FIG. 25.

The process places a completed composite preform on the slip sheet (operation 2700). The process terminates thereafter. In other examples, the placement of a composite preform on a slip sheet can involve multiple operations in which different components are placed onto the slip sheet for the composite preform.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 28:
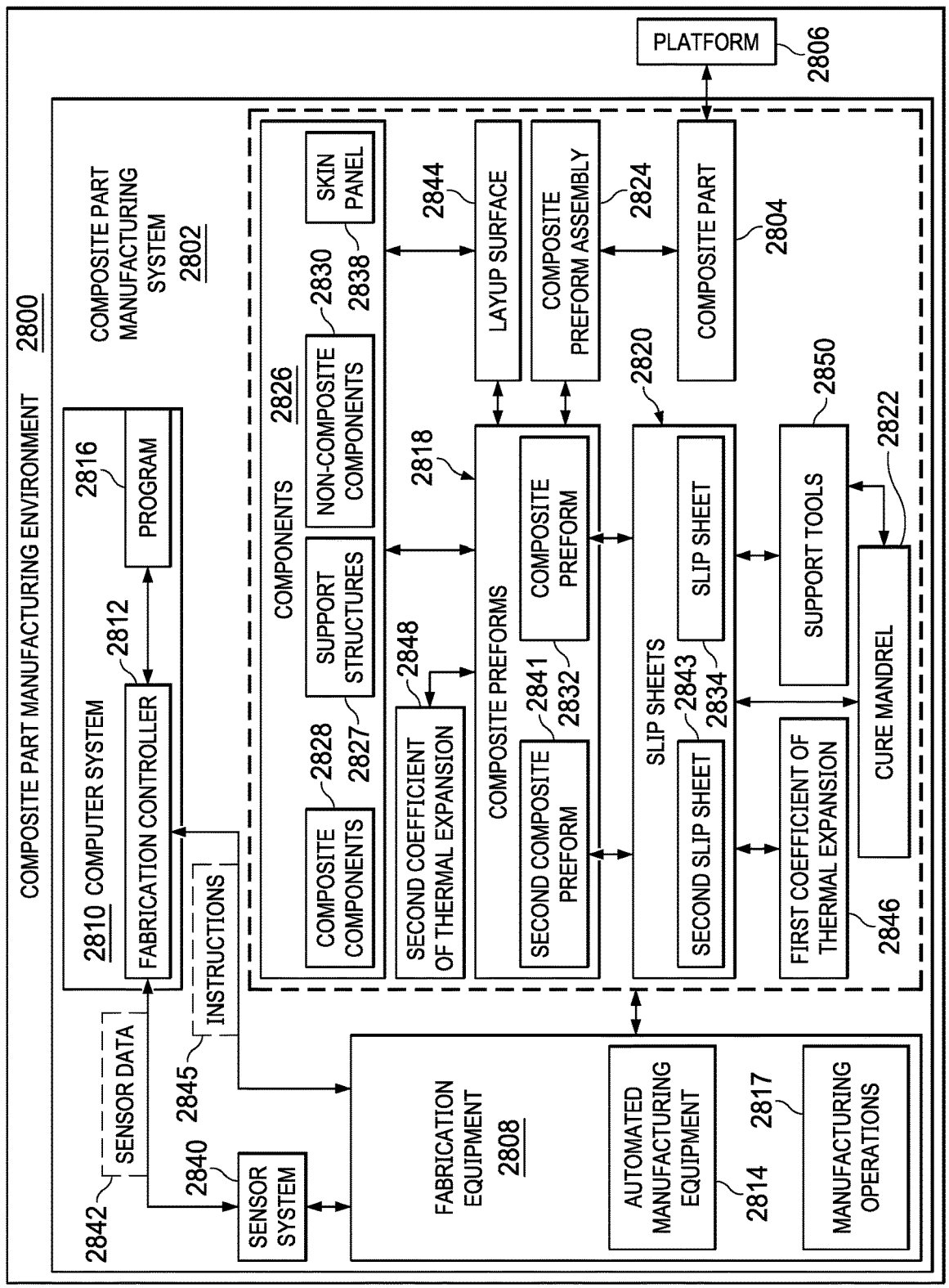
FIG. 28 is an illustration of a block diagram of a composite part manufacturing environment in accordance with an illustrative embodiment.

With reference now to FIG. 28, an illustration of a block diagram of a composite part manufacturing environment is depicted in accordance with an illustrative embodiment. The different components and operations shown and described in FIGS. 1-27 can be implemented in composite part manufacturing environment 2800.

In this illustrative example, composite part manufacturing system 2802 in composite part manufacturing environment 2800 can operate to manufacture composite part 2804 for platform 2806. In this illustrative example, platform 2806 can take a number of different forms. For example, platform 2806 can be selected from a group comprising a mobile platform, a stationary platform, a land-based structure, an aquatic-based structure, a space-based structure, an aircraft, a commercial aircraft, a rotorcraft, a tilt-rotor aircraft, a tilt wing aircraft, a vertical takeoff and landing aircraft, an electrical vertical takeoff and landing vehicle, a personal air vehicle, a surface ship, a tank, a personnel carrier, a train, a spacecraft, a space station, a satellite, a submarine, a rocket, an automobile, a power plant, a bridge, a dam, a house, a manufacturing facility, a building, and other suitable types of platforms.

Composite part 2804 for platform 2806 can also take a number of different forms. For example, composite part 2804 can be selected from at least one of a fuselage section, a fuselage barrel, a half barrel fuselage section, a skin panel, a stringer, a wing, a wing box, a nacelle, a door, a panel, a stiffened panel, a control surface, a vertical stabilizer, a horizontal stabilizer, a rudder, an elevator, aileron, a vehicle hood, a slat, a spoiler, a payload fairing, a wall panel, an engine nacelle, a wind turbine blade, a pipe, a composite sandwich panel, and other suitable types of composite parts for use in platform 2806.

In this illustrative example, composite part manufacturing system 2802 comprises a number of different components. As depicted, composite part manufacturing system 2802 includes fabrication equipment 2808, computer system 2810, and fabrication controller 2812.

Fabrication equipment 2808 is physical equipment and can include physical machines or devices that can be used to perform operations in manufacturing composite part 2804. In this illustrative example, fabrication equipment 2808 can include automated manufacturing equipment 2814. Automated manufacturing equipment 2814 is a hardware system and can include software. Automated manufacturing equipment 2814 can perform tasks without needing input or instructions from a human operator. Automated manufacturing equipment 2814 can include circuits such as a processor unit, an application specific integrated circuit (ASIC), or other hardware that is configured or designed to enable performance of the tasks. This hardware can be programmable and can be, for example, a computer numeric control (CNC) machine.

For example, automated manufacturing equipment 2814 can be robotic arm 222 in FIG. 2, overhead gantry crane 224 in FIG. 2, or other suitable types of automated manufacturing. Other equipment in automated manufacturing equipment 2814 that can be used include at least one of an automatic fiber placement (AFP) machine, a composite curing oven, and automated tape laying machine, or other suitable types of automated equipment.

As depicted, fabrication controller 2812 is located in computer system 2810. Fabrication controller 2812 can be implemented in software, hardware, firmware, or a combination thereof. When software is used, the operations performed by fabrication controller 2812 can be implemented in program code configured to run on hardware, such as a processor unit. When firmware is used, the operations performed by fabrication controller 2812 can be implemented in program code and data and stored in persistent memory to run on a processor unit. When hardware is employed, the hardware can include circuits that operate to perform the operations in fabrication controller 2812.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As used herein, a "number of" when used with reference items means one or more items. For example, a number of operations is one or more operations.

Computer system 2810 is a physical hardware system and includes one or more data processing systems. When more than one data processing system is present in computer system 2810, those data processing systems are in communication with each other using a communications medium. The communications medium can be a network. The data processing systems can be selected from at least one of a computer, a server computer, a tablet computer, or some other suitable data processing system. Computer system 2810 can be configured to perform at least one of the steps, operations, or actions described in the different illustrative examples using software, hardware, firmware, or a combination thereof.

In this illustrative example, program 2816 can be example of an implementation for fabrication controller 2812 when fabrication controller 2812 takes the form of software.

As depicted, sensor system 2840 is a physical hardware system that detects information about fabrication equipment 2808 including automated manufacturing equipment 2814, the environment around fabrication equipment 2808 including automated manufacturing equipment 2814, or both, to generate sensor data 2842. Sensor system 2840 can be comprised of at least one of a camera system, a laser sensor, an ultrasonic sensor, a light detection and ranging scanner, an encoder, a rotary encoder, a temperature sensor, a pressure sensor, an accelerometer, or some other suitable type of sensor.

Sensor system 2840 can generate sensor data 2842 about the operation of fabrication equipment 2808 including automated manufacturing equipment 2814. Sensor data 2842 can be used by fabrication controller 2812 to control the operation of fabrication equipment 2808 including automated manufacturing equipment 2814. In this illustrative example, a portion or all of sensor system 2840 can be associated or connected to automated manufacturing equipment 2814.

In this illustrative example, fabrication controller 2812 can use sensor data 2842 to generate instructions 2845. Instructions 2845 can be used to cause fabrication equipment 2808 to perform a number of manufacturing operations 2817. In this illustrative example, instructions 2845 can comprise at least one of commands, data, or other information that can control the operation of fabrication equipment 2808.

In this illustrative example, composite part manufacturing system 2802 can operate to manufacture composite part 2804 for platform 2806.

In this illustrative example, fabrication controller 2812 can perform one or more of the different operations illustrated in the flowcharts in FIGS. 14-27.

For example, fabrication controller 2812 can control fabrication equipment 2808 to perform manufacturing operations 2817 to manufacture composite part 2804. Fabrication controller 2812 can control fabrication equipment 2808 to place a set of composite preforms 2818 on a set of slip sheets 2820. Fabrication controller 2812 can control fabrication equipment 2808 to attach the set of slip sheets 2820 with the set of composite preforms 2818 to cure mandrel 2822 to form composite preform assembly 2824.

In this example, fabrication controller 2812 can place the set of composite preforms 2818 on corresponding slip sheets in the set of slip sheets 2820 in parallel. In other words, some or all the set of composite preforms 2818 can be placed onto the set of slip sheets 2820 at substantially the same time.

In this illustrative example, fabrication controller 2812 can control fabrication equipment 2808 to lay up composite components 2828 for a set of composite preforms 2818 on the set of slip sheets 2820. In other words, components 2826 in the form of composite components 2828 can be laid up on each slip sheet in the set of slip sheets 2820 to form a set of composite preforms 2818. Composite components 2828 can comprise at least one of a support structure, an isolation-ply, a ply, a skin panel, a frame filler, a stringer, a doubler, a caul, an inner surface assembly (ISA) caul or other suitable components.

Non-composite components 2830 in components 2826 can also be laid up in forming the set of composite preforms 2818. Non-composite components 2830 can be, for example, at least one of a metal caul, a plastic caul, a rubber caul, a plastic frame, or some other non-composite component. In other words, the set of composite preforms 2818 comprises composite components 2828 but can also include one or more of non-composite components 2830.

For example, fabrication controller 2812 can control fabrication equipment 2808 to lay up components 2826 the form of a set of support structures 2827 of composite preform 2832 in the set of composite preforms 2818 on slip sheet 2834 in the set of slip sheets 2820. The set of support structures 2827 laid up can be at least one of a ply, an isolation ply, a frame, a frame filler, a stringer, a doubler, a caul, or an inner surface assembly (ISA) caul, or other suitable component for the set of support structures 2827 of composite preform 2832 in the set of composite preforms 2818 on slip sheet 2834 in the set of slip sheets 2820.

In the illustrative example, fabrication controller 2812 can control fabrication equipment 2808 to lay up the composite component such as skin panel 2838 after laying up the set of support structures 2827 of composite preform 2832 to form composite preform 2832 on slip sheet 2834 in the set of slip sheets 2820.

In one illustrative example, the set of support structures 2827 is a first set of support structures 2827 of composite preform 2832. Fabrication controller 2812 can control fabrication equipment 2808 to lay up a second set of support structures 2827 of second composite preform 2841 on second slip sheet 2843 in the set of slip sheets 2820. The first set of support structures 2827 is different from the second set of support structures 2027.

In another illustrative example, the set of composite preforms 2818 on the set of slip sheets 2820 form layup surface 2844 when the set of slip sheets 2820 is attached to cure mandrel 2822. In other words, the set of composite preforms 2818 can come together when set of slip sheets 2820 are attached to cure mandrel 2822 to form layup surface 2844 that can be used to lay up additional components in components 2826 to form composite preform assembly 2824.

In this illustrative example, the set of slip sheets 2820 is comprised of a set of materials. The set of materials is selected to have first coefficient of thermal expansion 2846 that is within second coefficient of thermal expansion 2848 for the set of composite preforms 2818. In this example, first coefficient of thermal expansion 2846 can be within second coefficient of thermal expansion 2848 when first coefficient of thermal expansion 2846 is substantially equal to second coefficient of thermal expansion 2848. First coefficient of thermal expansion 2846 can also be within second coefficient of thermal expansion 2848 when first coefficient of thermal expansion 2846 is sufficiently close to second coefficient of thermal expansion 2848 such that an undesired expansion between set of slip sheets 2820 and the set of composite preforms 2818 does not occur during a cure process. This reduction in undesired expansion can reduce at least one of undesired inconsistencies that can result from expansion, contraction, and thermal stresses.

First coefficient of thermal expansion 2846 can also be within second coefficient of thermal expansion 2848 when first coefficient of thermal expansion 2846 is within a selected range of second coefficient of thermal expansion 2848. For example, the selected range can be when the two coefficients of thermal expansion are within 10 percent of each other. This range can be selected as one the reduces undesired inconsistencies occurring from the expansion between set of slip sheets 2820 and the set of composite preforms 2818 during curing.

In another illustrative example, a set of support tools 2850 for example, the set of composite preforms 2818 can be placed on the set of slip sheets 2820. The set of slip sheets 2820 with the set of composite preforms 2818 can then be placed onto a set of support tools 2850. In another illustrative example, the set of slip sheets 2820 can be placed on the set of support tools 2850. The set of composite preforms 2818 can then be placed on the set of slip sheets 2820 that have been placed on the set of support tools 2850. In this illustrative example, the set of slip sheets 2820 are indirectly attached to cure mandrel 2822 by attaching support tools 2850 with the set of slip sheets 2820 to cure mandrel 2822.

Figure 29:
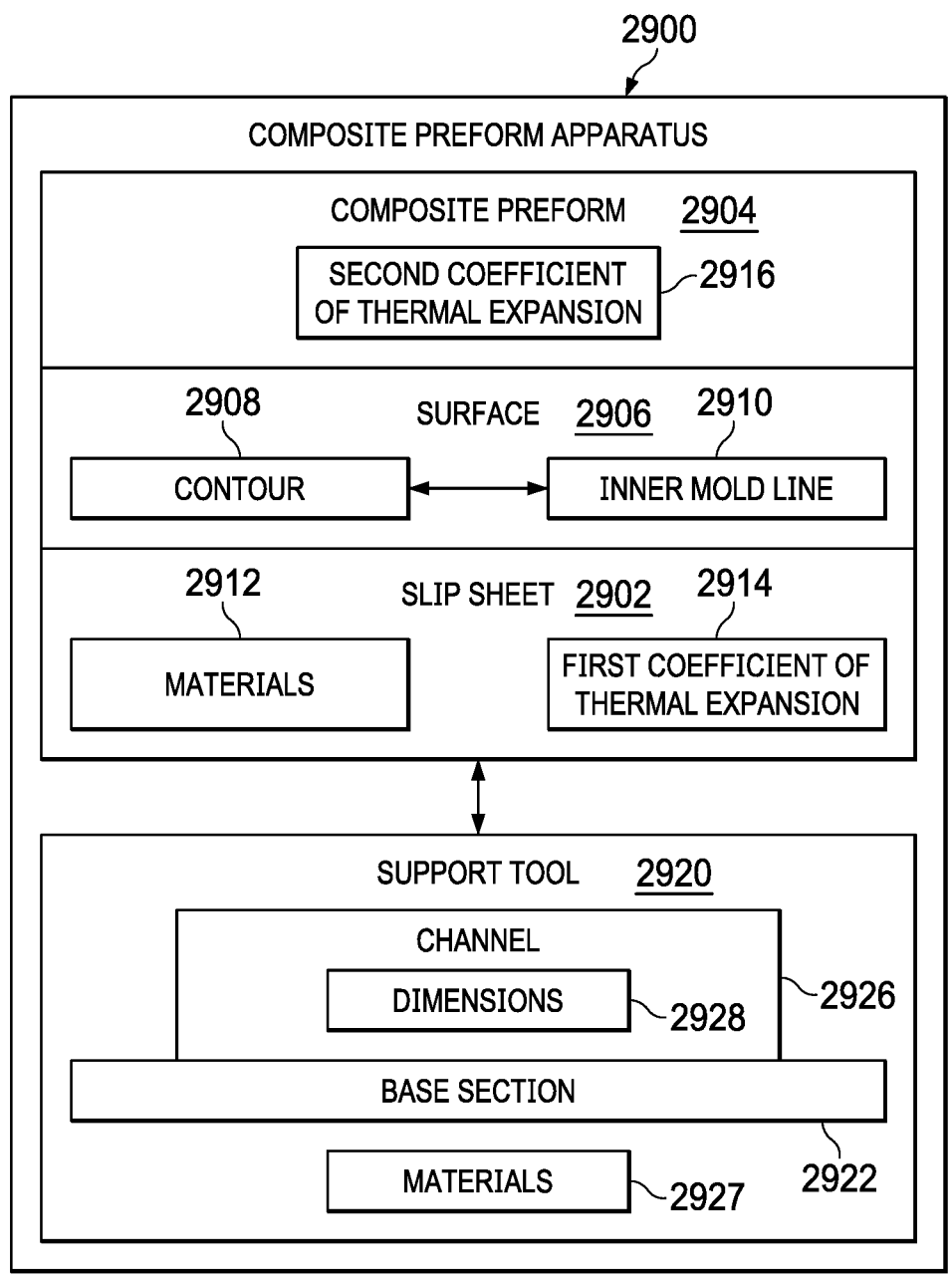
FIG. 29 is an illustration of a block diagram of a composite preform apparatus in accordance with an illustrative embodiment.

Turning next to FIG. 29, an illustration of a block diagram of a composite preform apparatus is depicted in accordance with an illustrative embodiment. As depicted, composite preform apparatus 2900 comprises slip sheet 2902. Slip sheet 2902 is an example of a slip sheet in slip sheets 2820 in FIG. 28.

Composite preform 2904 can be placed on surface 2906 of slip sheet 2902. In this illustrative example, surface 2906 can have contour 2908 for inner mold line (IML) 2910 for composite preform 2904. For example, contour 2908 can include at least one of a curve, a channel, a depression, a planar surface, or other features that can be used for placing components in composite preform 2904 onto surface 2906 of slip sheet 2902.

Slip sheet 2902 can be comprised of a number of different materials. For example, slip sheet 2902 can be comprised of a set of materials 2912 selected at least one a metal, a metal alloy, a composite material, or some other suitable material. In selecting one or more of materials 2912 for slip sheet 2902, slip sheet 2902 can be comprised of a set of materials 2912 selected to have first coefficient of thermal expansion 2914 that is within second coefficient of thermal expansion 2916 for composite preform 2904. In other words, first coefficient of thermal expansion for slip sheet 2902 is selected to be sufficiently close to second coefficient of thermal expansion 2916 for composite preform 2904 such that undesired expansions between composite preform 2904 and slip sheet 2902 during a cure process do not result in at least one of undesired inconsistencies in composite preform 2904 that can result from expansion, contraction, and thermal stresses.

In this illustrative example, support tool 2920 can also be part of composite preform apparatus 2900. Support tool 2920 comprises base section 2922 having channel 2926 in base section 2922. Channel 2926 has dimensions 2928 for receiving slip sheet 2902. Support tool 2920 can be comprised of a set of materials 2927 selected from at least one of a metal, a metal alloy, a plastic, a composite material, or some combination thereof.

In this illustrative example, support tool 2920 can provide additional structural support or rigidity for slip sheet 2902. With support tool 2920, undesired deformations or movement of composite preform 2904 can be avoided during transport to a cure mandrel and attachment of slip sheet 2902 to the cure mandrel. With the use of support tool 2920, slip sheet 2902 is indirectly attached to the cure mandrel through the direct attachment of support tool 2920 to the cure mandrel.

The illustration of composite part manufacturing environment 2800 in the different components in FIGS. 28 and 29 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although only a single cure mandrel is shown, one or more cure mandrels may be present in composite part manufacturing system 2802 in addition to cure mandrel 2822. Fabrication equipment 2808 can lay up composite preforms for manufacturing composite parts on these cure mandrels in parallel. Further, additional slip sheets in addition to slip sheets 2820 can be processed to lay up composite preforms while the set of slip sheets 2820 with the set of composite preforms 2818 are cured on cure mandrel 2822 to form composite part 2804. As a result, these additional slip sheets with composite preforms can be attached to cure mandrel 2822 as the composite part 2804 formed from composite preform assembly 2824 is removed from cure mandrel 2822.

As another example, fabrication controller 2812 can generate instructions 2845 that are sent to human operators who operate fabrication equipment 2808 in addition to using automated manufacturing equipment 2814 to perform manufacturing operations 2817. For example, instructions 2845 can be in the form of work orders used by human operators to perform manufacturing operations 2817.

Figure 30:
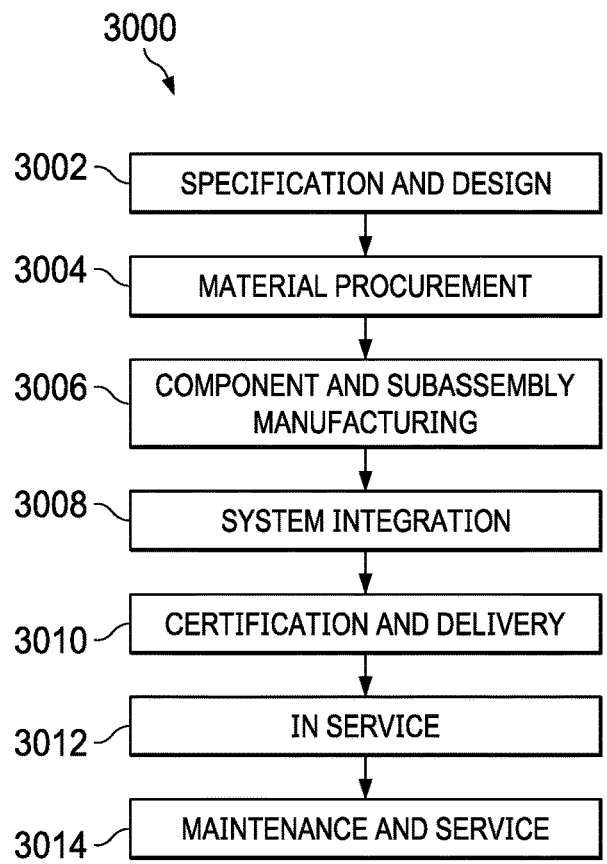
FIG. 30 is an illustration of an aircraft manufacturing and service method in accordance with an illustrative embodiment.
Figure 31:
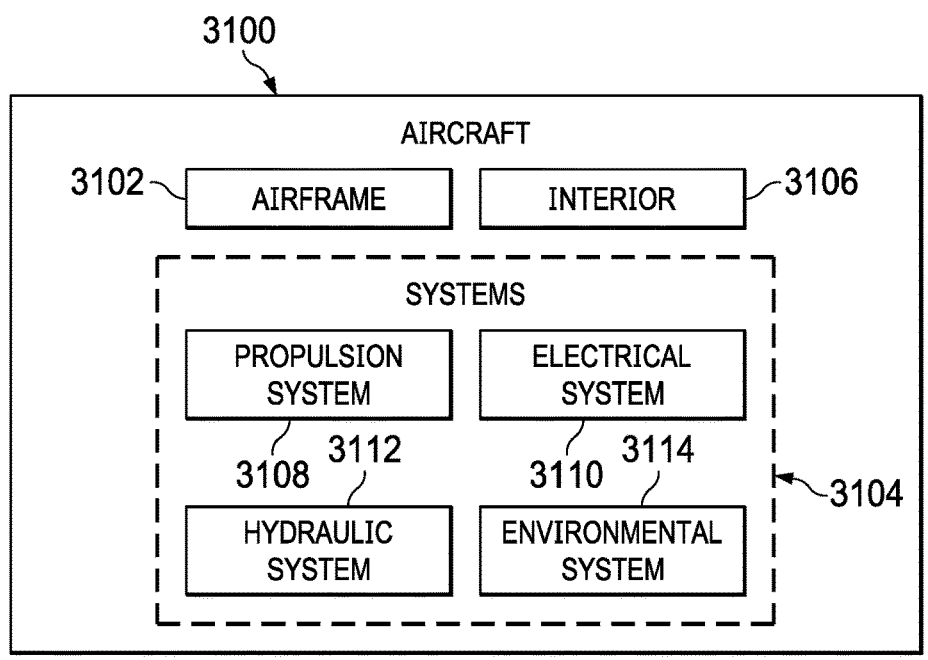
FIG. 31 is an illustration of a block diagram of an aircraft in which an illustrative embodiment may be implemented.

The illustrative embodiments of the disclosure may be described in the context of aircraft manufacturing and service method 3000 as shown in FIG. 30 and aircraft 3100 as shown in FIG. 31. Turning first to FIG. 30, an illustration of an aircraft manufacturing and service method in accordance with an illustrative embodiment. During pre-production, aircraft manufacturing and service method 3000 may include specification and design 3002 of aircraft 3100 in FIG. 31 and material procurement 3004.

During production, component and subassembly manufacturing 3006 and system integration 3008 of aircraft 3100 in FIG. 31 takes place. Thereafter, aircraft 3100 in FIG. 31 can go through certification and delivery 3010 in order to be placed in service 3012. While in service 3012 by a customer, aircraft 3100 in FIG. 31 is scheduled for routine maintenance and service 3014, which may include modification, reconfiguration, refurbishment, and other maintenance or service.

Each of the processes of aircraft manufacturing and service method 3000 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 31, an illustration of a block diagram of an aircraft is depicted in which an illustrative embodiment may be implemented. In this example, aircraft 3100 is produced by aircraft manufacturing and service method 3000 in FIG. 30 and may include airframe 3102 with plurality of systems 3104 and interior 3106. Examples of systems 3104 include one or more of propulsion system 3108, electrical system 3110, hydraulic system 3112, and environmental system 3114. In the illustrative examples, composite part manufacturing can be performed using composite preforms on slip sheets that are attached to cure mandrels to form composite parts for at least one of airframe 3102, interior 3106, for systems 3104 in aircraft 3100. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 3000 in FIG. 30.

In one illustrative example, components or subassemblies produced in component and subassembly manufacturing 3006 in FIG. 30 can be fabricated or manufactured in a manner similar to components or subassemblies produced while aircraft 3100 is in service 3012 in FIG. 30. As yet another example, one or more apparatus embodiments, method embodiments, or a combination thereof can be utilized during production stages, such as component and subassembly manufacturing 3006 and system integration 3008 in FIG. 30. One or more apparatus embodiments, method embodiments, or a combination thereof may be utilized while aircraft 3100 is in service 3012, during maintenance and service 3014 in FIG. 30, or both. The use of a number of the different illustrative embodiments may substantially expedite the assembly of aircraft 3100, reduce the cost of aircraft 3100, or both expedite the assembly of aircraft 3100 and reduce the cost of aircraft 3100.

The use of composite part manufacturing system 2802 in FIG. 28 can increase the throughput of composite part manufacturing through the use of slip sheets for laying up composite preforms prior to attachment to cure mandrels. Further, the system can also reduce the capital costs through reducing the time that mandrels are tied up in fabricated composite parts. Further, the use of skin panels can also reduce costs associated with tooling and wear-and-tear.

Figure 32:
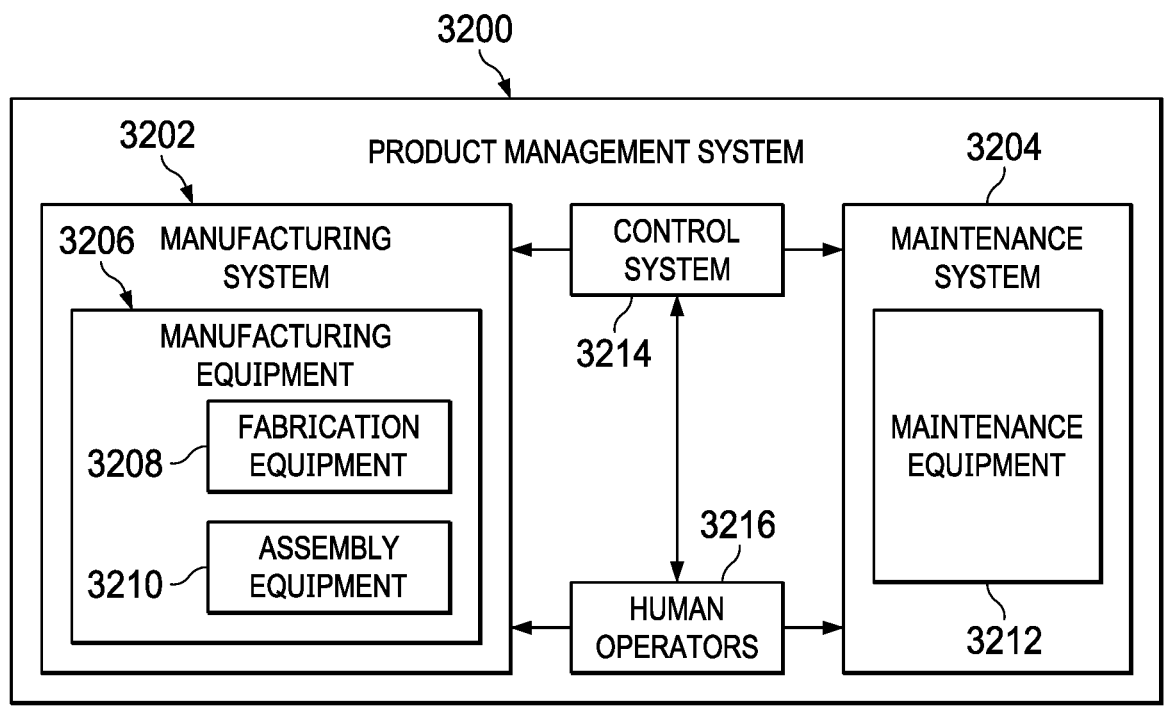
FIG. 32 is an illustration of a block diagram of a product management system in accordance with an illustrative embodiment.

Turning now to FIG. 32, an illustration of a block diagram of a product management system is depicted in accordance with an illustrative embodiment. Product management system 3200 is a physical hardware system. In this illustrative example, product management system 3200 includes at least one of manufacturing system 3202 or maintenance system 3204.

Manufacturing system 3202 is configured to manufacture products, such as aircraft 3100 in FIG. 31. As depicted, manufacturing system 3202 includes manufacturing equipment 3206. Manufacturing equipment 3206 includes at least one of fabrication equipment 3208 or assembly equipment 3210.

Fabrication equipment 3208 is equipment that used to fabricate components for parts used to form aircraft 3100 in FIG. 31. For example, fabrication equipment 3208 can include machines and tools. These machines and tools can be at least one of a drill, a hydraulic press, a furnace, an autoclave, a mold, a composite tape laying machine, an automated fibre placement (AFP) machine, a vacuum system, a robotic pick and place system, a flatbed cutting machine, a laser cutter, a computer numerical control (CNC) cutting machine, a lathe, or other suitable types of equipment. Fabrication equipment 3208 can be used to fabricate at least one of metal parts, composite parts, semiconductors, circuits, fasteners, ribs, skin panels, spars, antennas, or other suitable types of parts.

Assembly equipment 3210 is equipment used to assemble parts to form aircraft 3100 in FIG. 31. In particular, assembly equipment 3210 is used to assemble components and parts to form aircraft 3100 in FIG. 31. Assembly equipment 3210 also can include machines and tools. These machines and tools may be at least one of a robotic arm, a crawler, a faster installation system, a rail-based drilling system, or a robot. Assembly equipment 3210 can be used to assemble parts such as seats, horizontal stabilizers, wings, engines, engine housings, landing gear systems, and other parts for aircraft 3100 in FIG. 31.

In this illustrative example, maintenance system 3204 includes maintenance equipment 3212. Maintenance equipment 3212 can include any equipment needed to perform maintenance on aircraft 3100 in FIG. 31. Maintenance equipment 3212 may include tools for performing different operations on parts on aircraft 3100 in FIG. 31. These operations can include at least one of disassembling parts, refurbishing parts, inspecting parts, reworking parts, manufacturing replacement parts, or other operations for performing maintenance on aircraft 3100 in FIG. 31. These operations can be for routine maintenance, inspections, upgrades, refurbishment, or other types of maintenance operations.

In the illustrative example, maintenance equipment 3212 may include ultrasonic inspection devices, x-ray imaging systems, vision systems, drills, crawlers, and other suitable devices. In some cases, maintenance equipment 3212 can include fabrication equipment 3208, assembly equipment 3210, or both to produce and assemble parts that needed for maintenance.

Product management system 3200 also includes control system 3214. Control system 3214 is a hardware system and may also include software or other types of components. Control system 3214 is configured to control the operation of at least one of manufacturing system 3202 or maintenance system 3204. In particular, control system 3214 can control the operation of at least one of fabrication equipment 3208, assembly equipment 3210, or maintenance equipment 3212.

The hardware in control system 3214 can be implemented using hardware that may include computers, circuits, networks, and other types of equipment. The control may take the form of direct control of manufacturing equipment 3206. For example, robots, computer-controlled machines, and other equipment can be controlled by control system 3214. In other illustrative examples, control system 3214 can manage operations performed by human operators 3216 in manufacturing or performing maintenance on aircraft 3100.

For example, control system 3214 can assign tasks, provide instructions, display models, or perform other operations to manage operations performed by human operators 3216. In these illustrative examples, fabrication controller 2812 in FIG. 28 can be implemented in control system 3214 to manage at least one of the manufacturing or maintenance of aircraft 3100 in FIG. 31. In the illustrative example, the manufacturer maintenance of aircraft 3100 in FIG. 31 can include manufacturing composite parts for fabricating or forming maintenance on aircraft 3100.

In the different illustrative examples, human operators 3216 can operate or interact with at least one of manufacturing equipment 3206, maintenance equipment 3212, or control system 3214. This interaction can occur to manufacture aircraft 3100 in FIG. 31.

Of course, product management system 3200 may be configured to manage other products other than aircraft 3100 in FIG. 31. Although product management system 3200 has been described with respect to manufacturing in the aerospace industry, product management system 3200 can be configured to manage products for other industries. For example, product management system 3200 can be configured to manufacture products for the automotive industry as well as any other suitable industries.

Thus, the illustrative examples provide a method apparatus, and system method for manufacturing a composite part. A set of composite preforms is placed on a set of slip sheets. The set of slip sheets with the set of composite preforms is attached to a cure mandrel to form a composite preform assembly.

As a result, the one or more illustrative examples can increase the throughput of composite part manufacturing through the use of slip sheets for laying up composite preforms prior to attachment to cure mandrels. Further, the system can also reduce the capital costs through reducing the time that mandrels are tied up in fabricating composite parts. Further, the use of skin panels can also reduce costs associated with tooling and wear-and-tear.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for manufacturing a composite part, the method comprising:

placing a set of composite preforms on a set of slip sheets;
placing the set of slip sheets with the set of composite preforms on a set of support tools in a channel formed in the set of support tools, wherein the set of composite preforms lays on a surface of the set of slip sheets and a surface of the set of support tools;
attaching the set of support tools with the set of slip sheets with the set of composite preforms to a cure mandrel;
forming the composite part, wherein forming the composite part comprises curing the set of composite preforms while the support tools with the set of slip sheets are attached to the cure mandrel;
removing the composite part from the cure mandrel;
removing the set of slip sheets from the composite part; and
transporting the set of slip sheets with the set of composite preforms on the set of support tools to the cure mandrel after placing the set of slip sheets and before attaching the set of support tools.

2. The method of claim 1 further comprising:
placing another set of composite preforms on another set of slip sheets on another set of support tools in parallel with placing the set of composite preforms on the set of slip sheets on the set of support tools as part of a parallel fabrication process;
attaching the another set of support tools with the another set of slip sheets with the another set of composite preforms to the cure mandrel, wherein the another set of support tools are attached adjacent the cure mandrel; and
transporting the another set of slip sheets with the another set of composite preforms on the another set of support tools to the cure mandrel after placing the another set of slip sheets and before attaching the another set of support tools,
wherein the set of support tools are attached adjacent the another set of support tools.

3. The method of claim 1, wherein placing the set of composite preforms on the set of slip sheets comprises:
laying up a set of support structures of a composite preform in the set of composite preforms on a slip sheet in the set of slip sheets.

4. The method of claim 3 wherein placing the set of composite preforms on the set of slip sheets further comprises:
laying up a skin panel after laying up the set of support structures of the composite preform on the slip sheet in the set of slip sheets.

5. The method of claim 3, wherein laying up the set of support structures of the composite preform on the slip sheet in the set of slip sheets comprises:
laying up at least one of a ply, an isolation ply, a frame, a frame filler, a stringer, a doubler, a caul, or an inner surface assembly (ISA) caul as the set of support structures of the composite preform on the slip sheet in the set of slip sheets.

6. The method of claim 3, wherein the set of support structures is a first set of support structures and wherein placing the set of composite preforms on the set of slip sheets further comprises:
laying up a second set of support structures of a second composite preform on a second slip sheet in the set of slip sheets, wherein the first set of support structures is different from the second set of support structures.

7. The method of claim 1 further comprising:
splicing a first splice region of a skin panel in a first composite preform with a second splice region of a second skin panel in a second composite preform on an adjacent slip sheet.

8. The method of claim 1, wherein the set of composite preforms on the set of slip sheets form a layup surface and further comprising:
laying up a set of composite components on the layup surface.

9. The method of claim 8, wherein laying up the set of composite components on the layup surface comprises:
laying up the set of composite components on the layup surface, wherein the set of composite components comprises at least one of a support structure, an isolation ply, a ply, a skin panel, a frame filler, a stringer, a doubler, a caul, or an inner surface assembly (ISA) caul.

10. The method of claim 1, wherein placing the set of composite preforms on the set of slip sheets comprises:
placing the set of composite preforms on the set of slip sheets, wherein the set of slip sheets is comprised of a set of materials selected to have a first coefficient of thermal expansion that is within a selected tolerance of a second coefficient of thermal expansion for the set of composite preforms.

11. The method of claim 1, wherein connecting the set of slip sheets to the cure mandrel comprises:
coupling the set of slip sheets to the cure mandrel using at least one of a magnetic attachment system, a vacuum attachment system, a mechanical attachment system, or a physical locking system.

12. The method of claim 1, further comprising separating the set of support tools from the composite part.

13. The method of claim 1, wherein the composite part is one of a fuselage section, a fuselage barrel, a half barrel fuselage section, a wing, a control surface, a slat, a spoiler, an aileron, a vertical stabilizer, engine nacelle, stiffened panels, payload fairing for a rocket, wind turbine blade, or a horizontal stabilizer.

14. A method for composite part fabrication, the method comprising:
placing a set of composite components for a composite preform on a slip sheet;
placing the slip sheet with the set of composite components in a channel formed in a surface of a support tool;
attaching the support tool with the slip sheet with the set of composite components to a cure mandrel;
curing the set of composite components while the slip sheet on the support tool is attached to the cure mandrel;
removing the cured set of composite components from the cure mandrel;
removing the slip sheet from the cured set of composite components; and
transporting the slip sheet with the set of composite components on the support tool to the cure mandrel after placing the slip sheet and before attaching the support tool.

15. The method of claim 14, further comprising separating the support tool from the cured set of composite components.

16. The method of claim 14, further comprising:
placing another set of composite preforms on another slip sheet on another support tool in parallel with placing the set of composite preforms on the slip sheet on the support tool as part of a parallel fabrication process;

attaching the another support tool with the another slip sheet with the another set of composite preforms to the cure mandrel; and transporting the another slip sheet with the another set of composite preforms on the another support tool to the cure mandrel after placing the another slip sheet and before attaching the another support tool, wherein the support tool is attached adjacent the another support tool.

17. The method of claim 14, wherein placing the set of composite components on the slip sheet comprises:

laying up a set of support structures on the slip sheet.

18. The method of claim 17, wherein placing the set of composite components on the slip sheet further comprises:

laying up a skin panel on the slip sheet after placing the set of support structures to form a composite preform on the slip sheet.

19. The method of claim 14, wherein placing the set of composite components on the slip sheet comprises:

placing at least one of a completed composite preform, a support structure, an isolation ply, a frame, a frame filler, a stringer, a doubler, or a skin panel as the set of composite components on the slip sheet.

20. The method of claim 14, wherein placing the set of composite components on the slip sheet comprises:

placing the set of composite components for a composite preform on the slip sheet, wherein the slip sheet is comprised of a set of materials selected to have a first coefficient of thermal expansion that is within a selected tolerance of a second coefficient of thermal expansion for the composite preform.

21. The method of claim 14, wherein the cured set of composite components is one of a fuselage section, a fuselage barrel, a half barrel fuselage section, a wing, a control surface, a slat, a spoiler, an aileron, a vertical stabilizer, engine nacelle, stiffened panels, payload fairing for a rocket, wind turbine blade, and a horizontal stabilizer.

* * * * *